(12) United States Patent
Jeong et al.

(10) Patent No.: US 11,730,302 B2
(45) Date of Patent: Aug. 22, 2023

(54) BLENDER

(71) Applicant: LG ELECTRONICS INC., Seoul (KR)

(72) Inventors: Jeonghoon Jeong, Seoul (KR); Daebong Yang, Seoul (KR); Jeahyuk Wie, Seoul (KR); Kookhaeng Lee, Seoul (KR); Yangho Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 45 days.

(21) Appl. No.: 17/036,721

(22) Filed: Sep. 29, 2020

(65) Prior Publication Data

US 2021/0100392 A1 Apr. 8, 2021

(30) Foreign Application Priority Data

Oct. 7, 2019 (KR) .......................... 10-2019-0123876
Oct. 14, 2019 (KR) .......................... 10-2019-0127179

(51) Int. Cl.
*A47J 27/21* (2006.01)
*A47J 43/046* (2006.01)
*A47J 43/07* (2006.01)

(52) U.S. Cl.
CPC ....... *A47J 27/21175* (2013.01); *A47J 43/046* (2013.01); *A47J 43/0716* (2013.01)

(58) Field of Classification Search
CPC .............. A47J 27/21175; A47J 31/4407; A47J 43/0716
See application file for complete search history.

(56) References Cited

U.S. PATENT DOCUMENTS

| 2016/0287018 | A1 | 10/2016 | Thomas et al. |
| 2019/0069726 | A1 | 3/2019 | Hunt et al. |
| 2021/0177196 | A1* | 6/2021 | Upston .................. A47J 36/10 |

FOREIGN PATENT DOCUMENTS

| CN | 202518588 U | 11/2012 |
| CN | 106264199 A | 1/2017 |
| CN | 106264199 B | 1/2019 |
| CN | 208909913 U | 5/2019 |
| JP | 2014-073276 A | 4/2014 |
| KR | 10-2012-0060568 A | 6/2012 |
| KR | 10-2014-0023623 A | 2/2014 |
| KR | 20150145163 A | 12/2015 |
| KR | 10-1618729 B1 | 5/2016 |
| KR | 10-2012-0060568 A | 6/2016 |
| KR | 10-1833279 B1 | 4/2018 |

(Continued)

*Primary Examiner* — Elizabeth Insler
(74) *Attorney, Agent, or Firm* — Bryan Cave Leighton Paisner LLP

(57) ABSTRACT

A blender having an exterior material is provided on an outer surface of a container lid. The blender includes a container body to receive food; a blender body provided at a lower side of the container body and supporting the container body; and a container lid mounted removably to an upper surface of the container body and opening and closing the upper surface of the container body, where the container lid includes a lid casing having a gasket provided at a lower portion thereof; and a lid exterior material covering at least one surface of the lid casing. The lower part of the lid exterior material extends up to an upper part of the gasket, and the lower end of the lid exterior material is bent inward.

15 Claims, 19 Drawing Sheets

(56) References Cited

FOREIGN PATENT DOCUMENTS

| | | |
|---|---|---|
| KR | 10-2018-0110870 A | 10/2018 |
| KR | 10-2018-0110870 A1 | 10/2018 |
| KR | 10-1904337 B1 | 10/2018 |
| WO | 2019095732 A1 | 5/2019 |
| WO | 2020000048 A1 | 1/2020 |

* cited by examiner

[FIG.1]
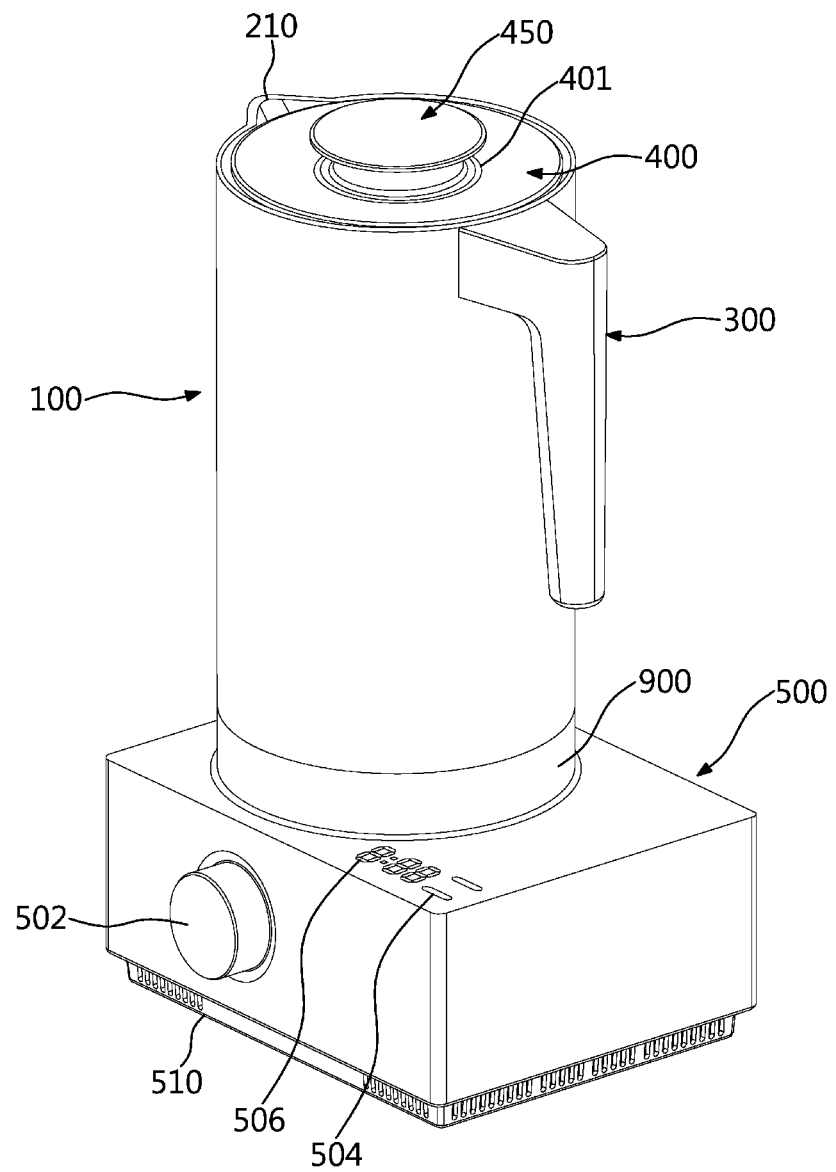

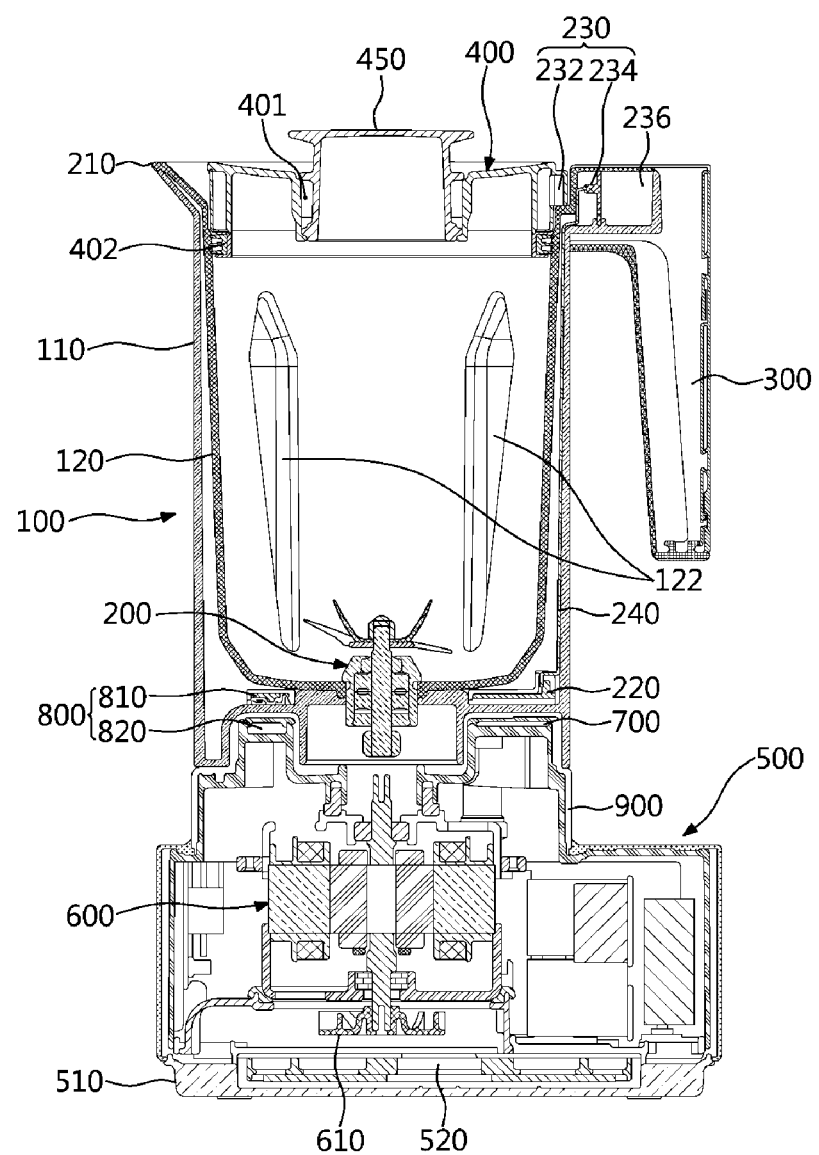
[FIG.2]

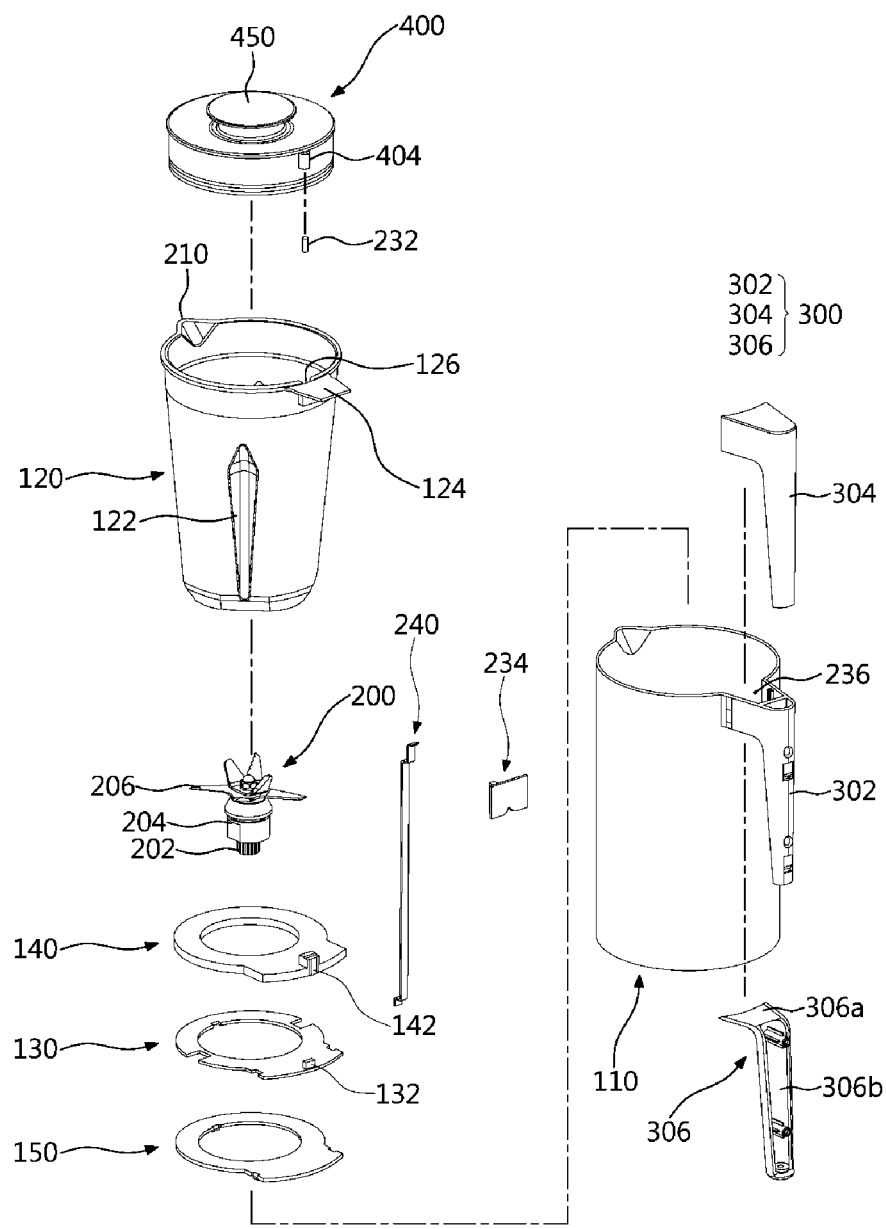
[FIG.3]

[FIG.4]
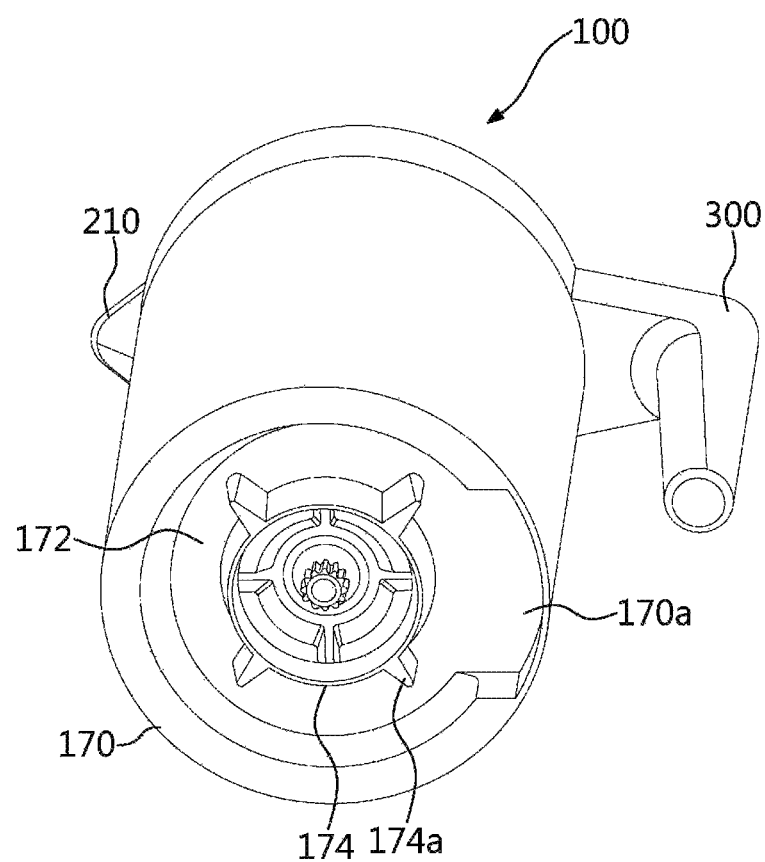

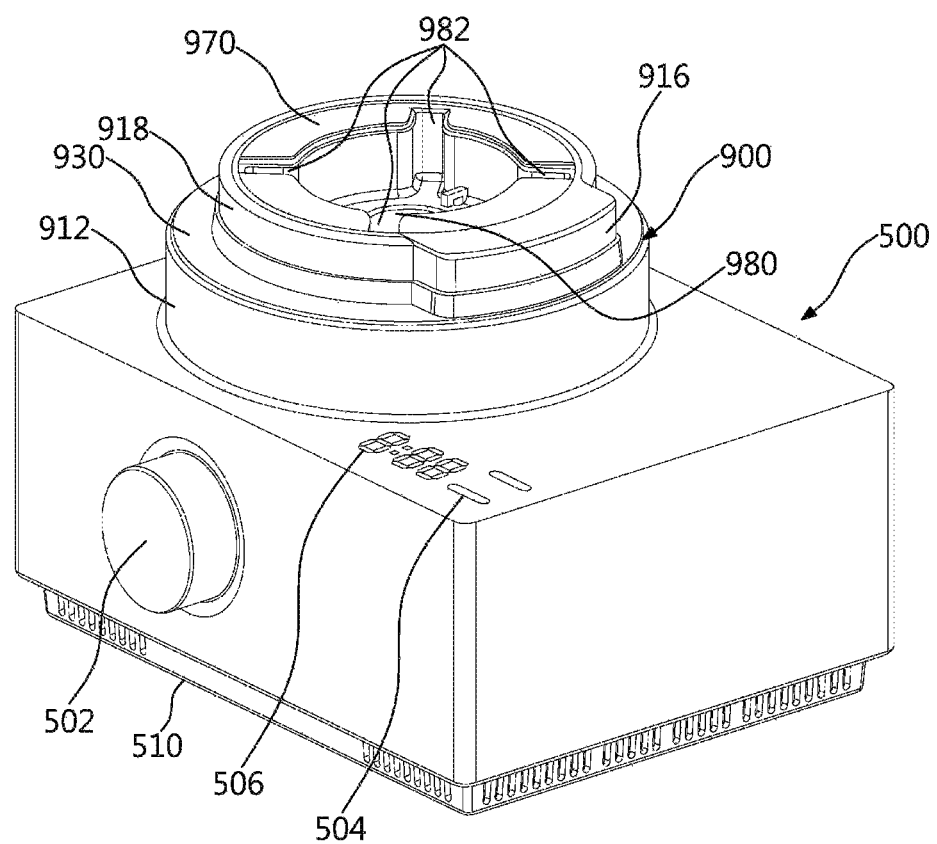
[FIG.5]

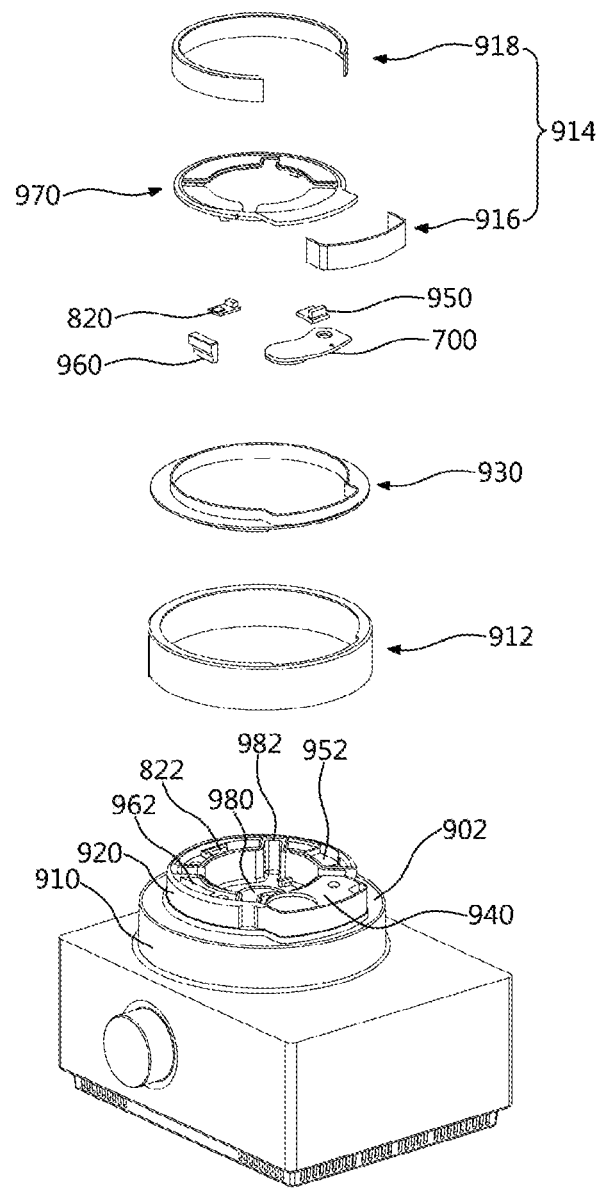
[FIG.6]

[FIG.7]
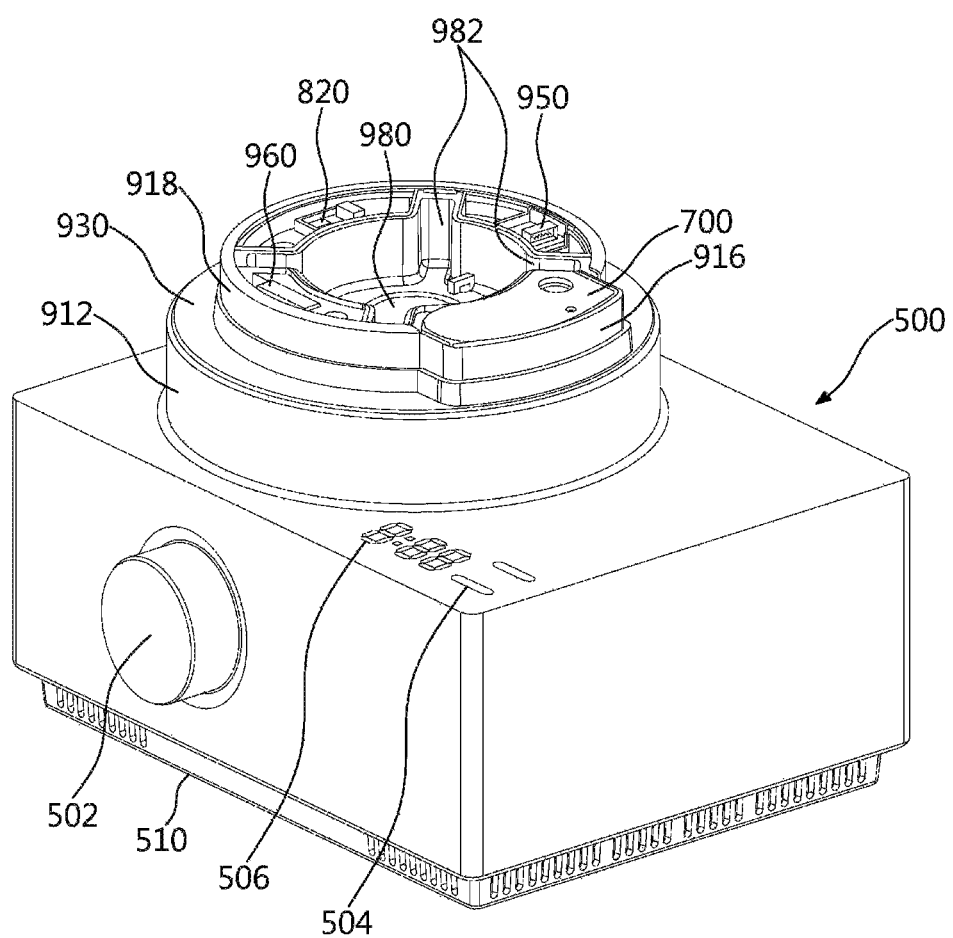

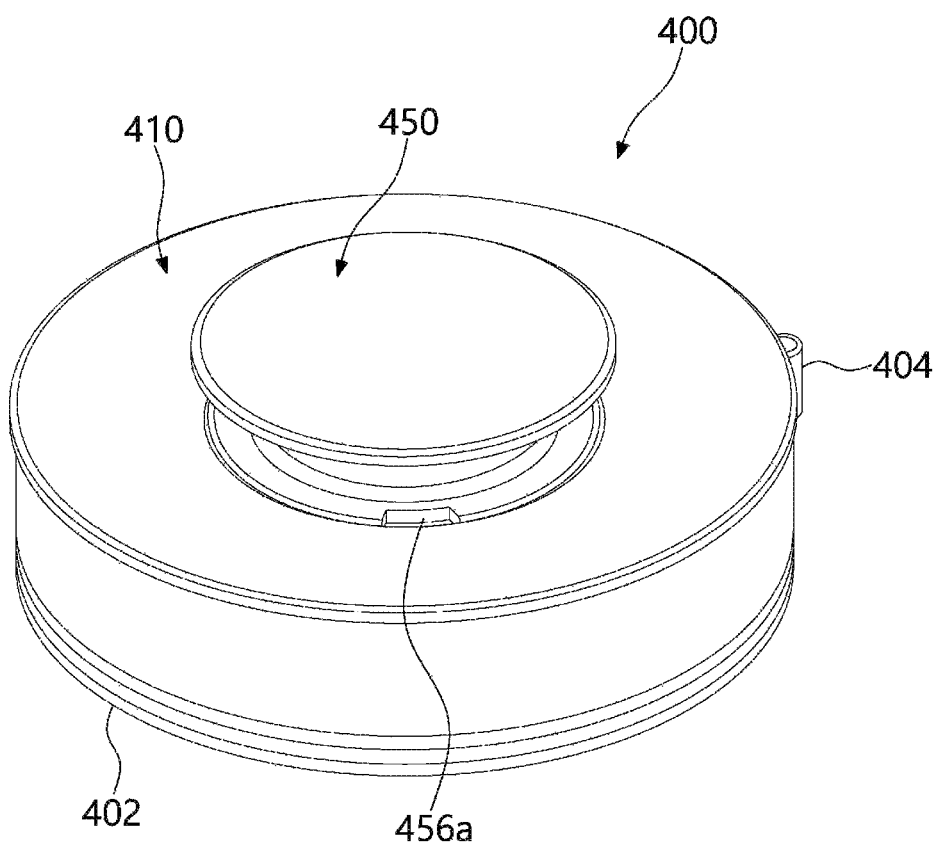
[FIG.8]

[FIG.9]
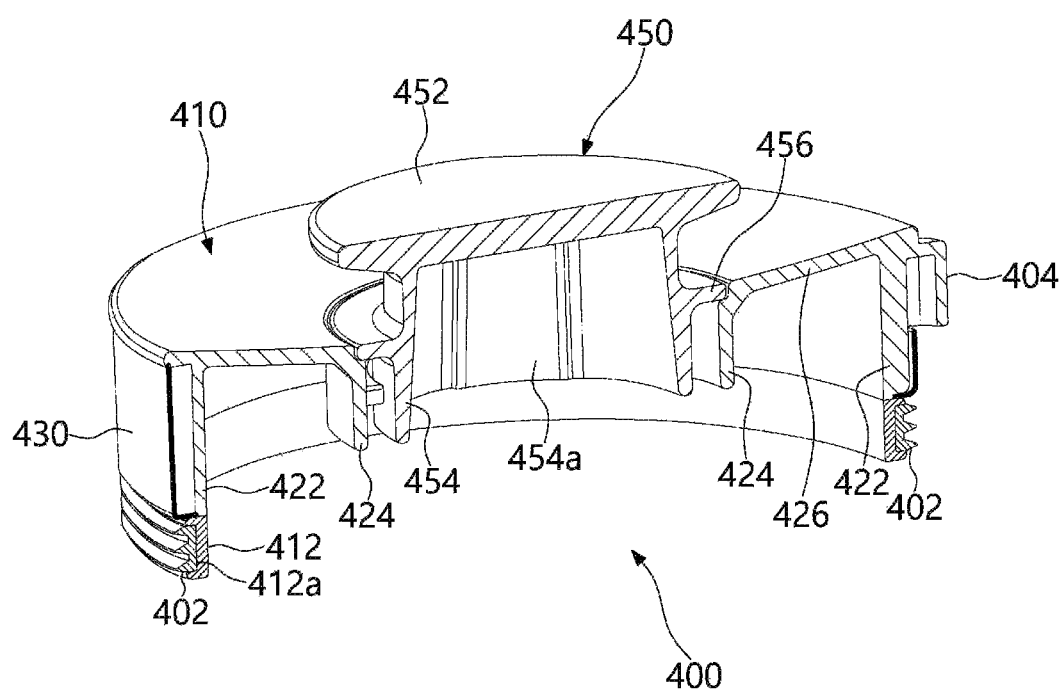

[FIG.10]
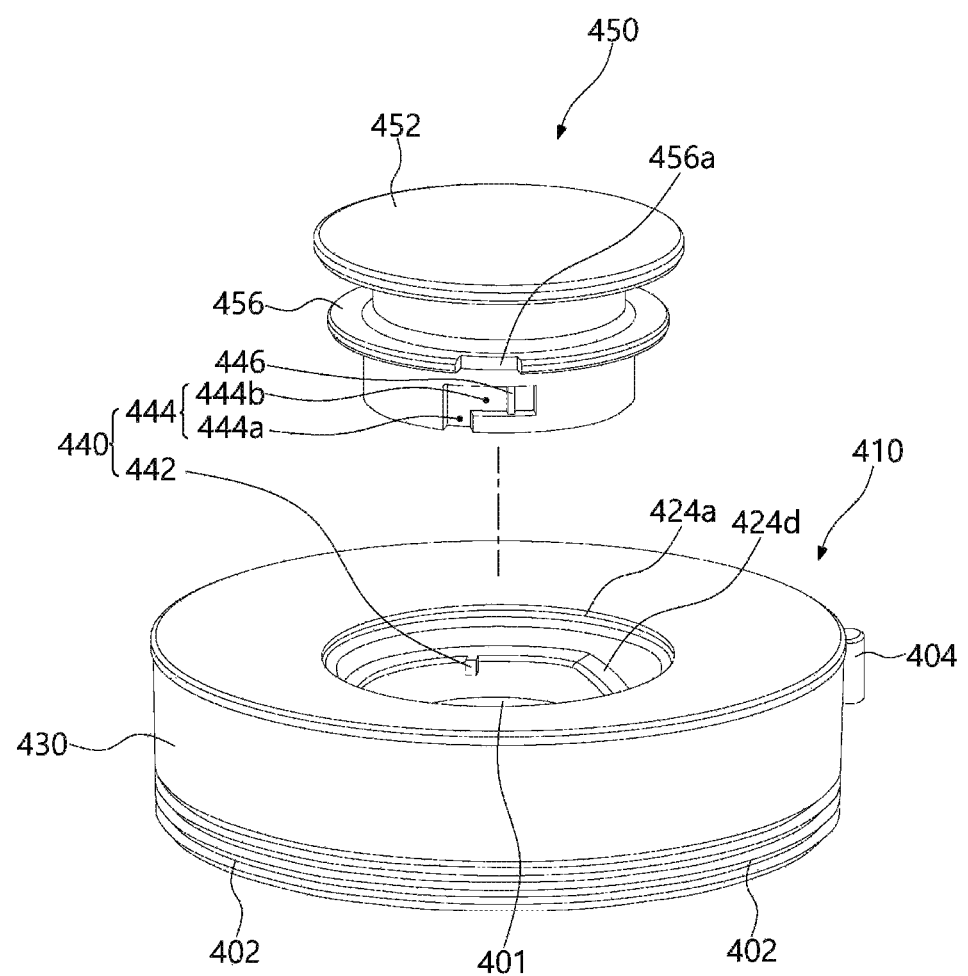

[FIG.11]
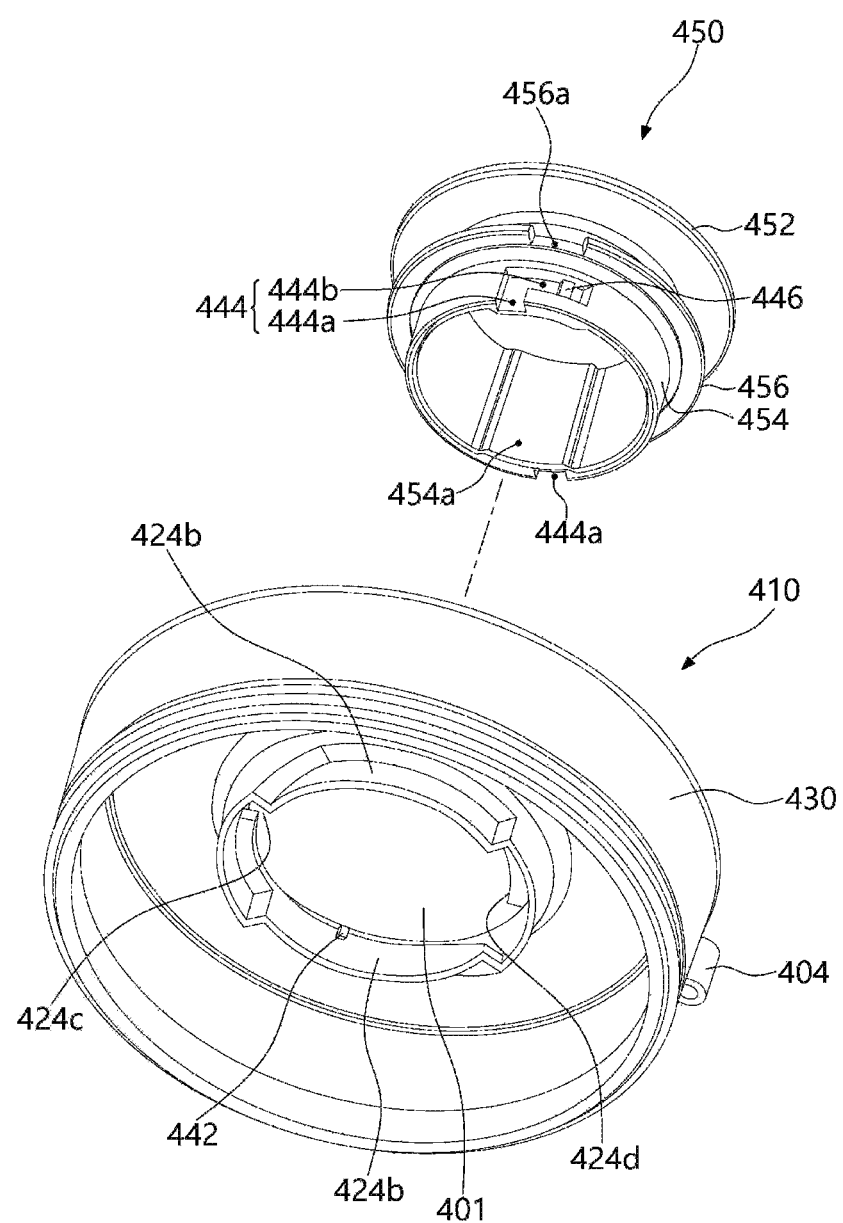

[FIG.12]
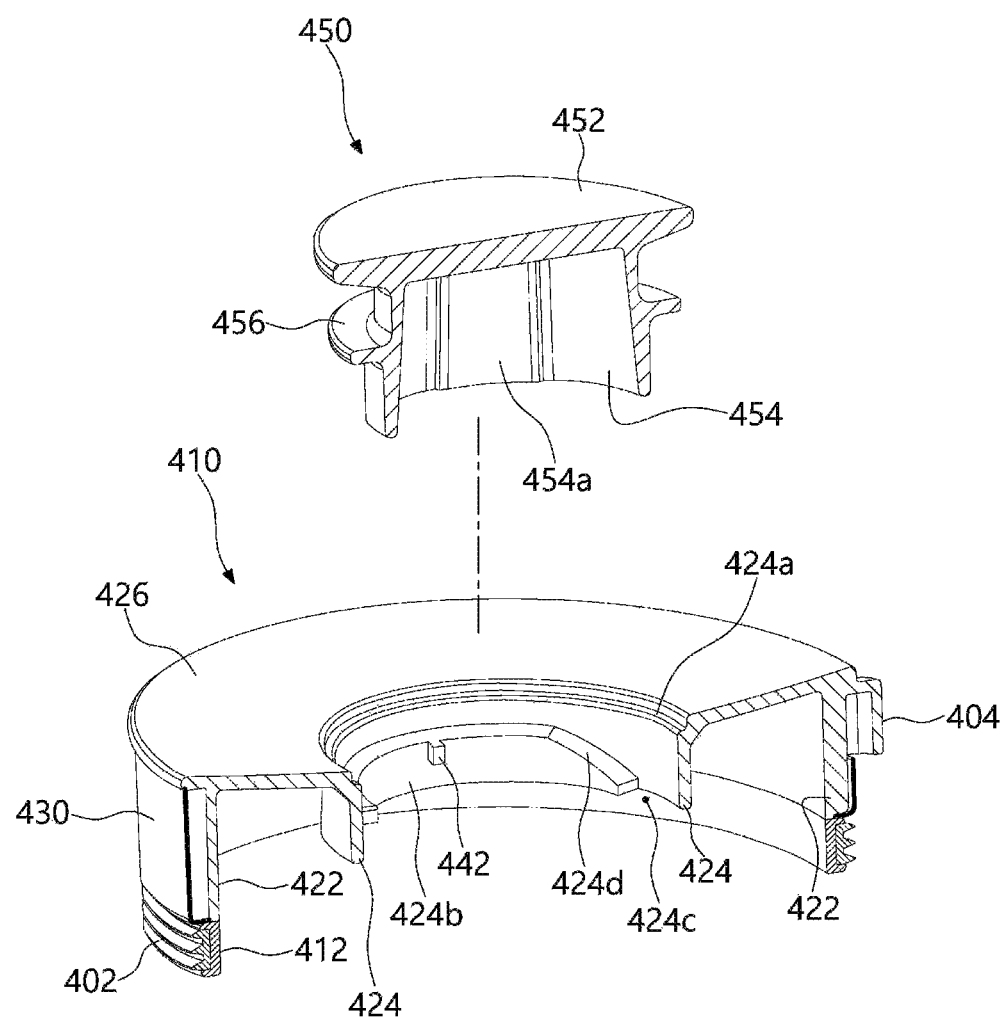

[FIG.13]
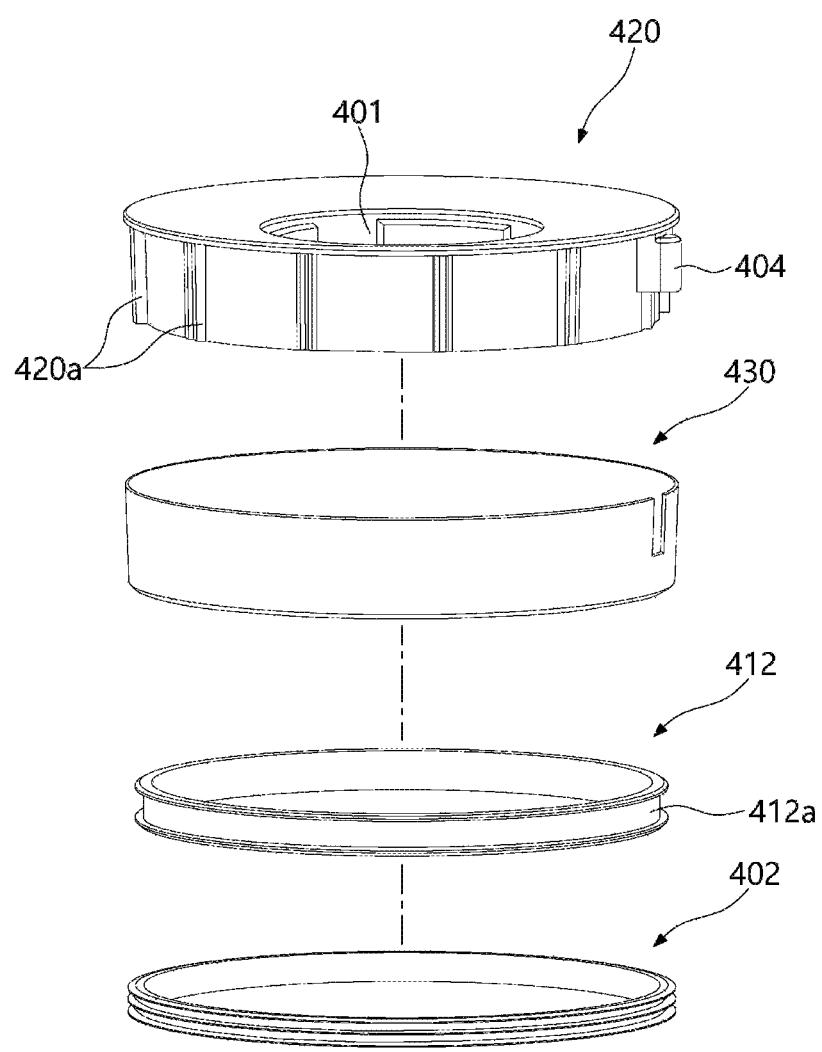

[FIG.14]
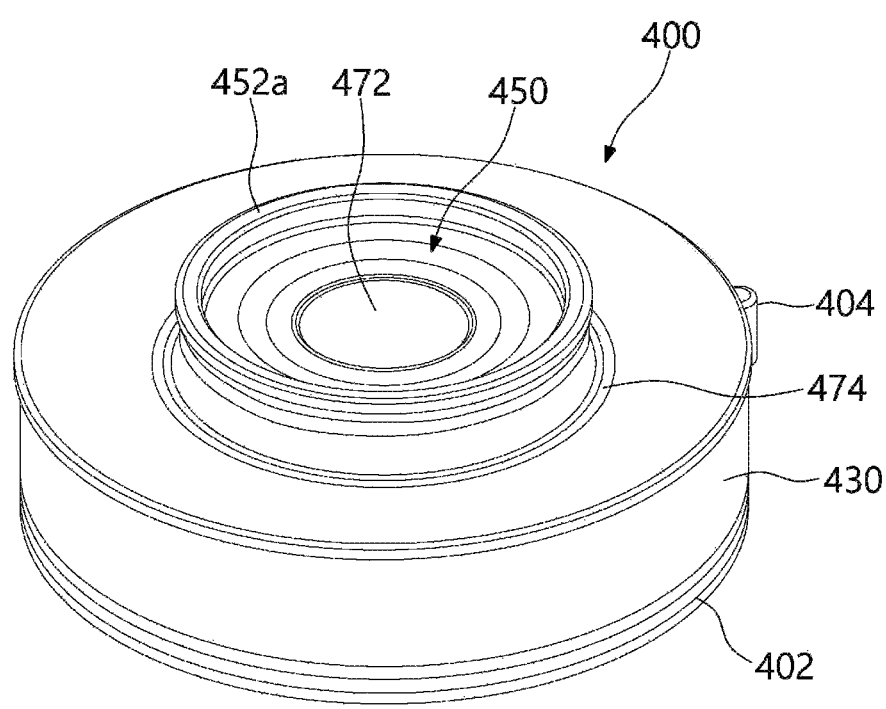

[FIG.15]
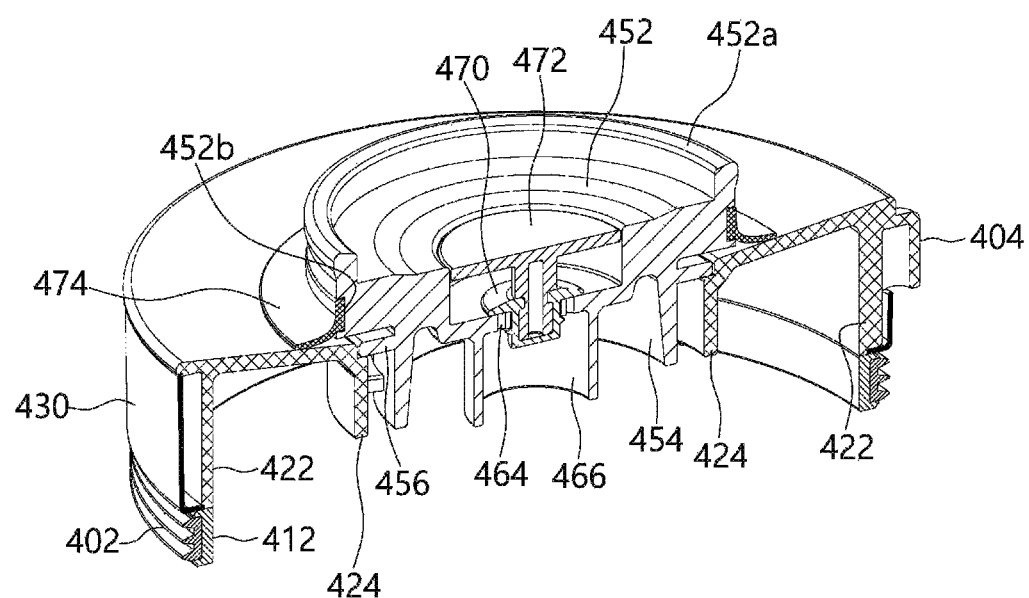

[FIG.16]
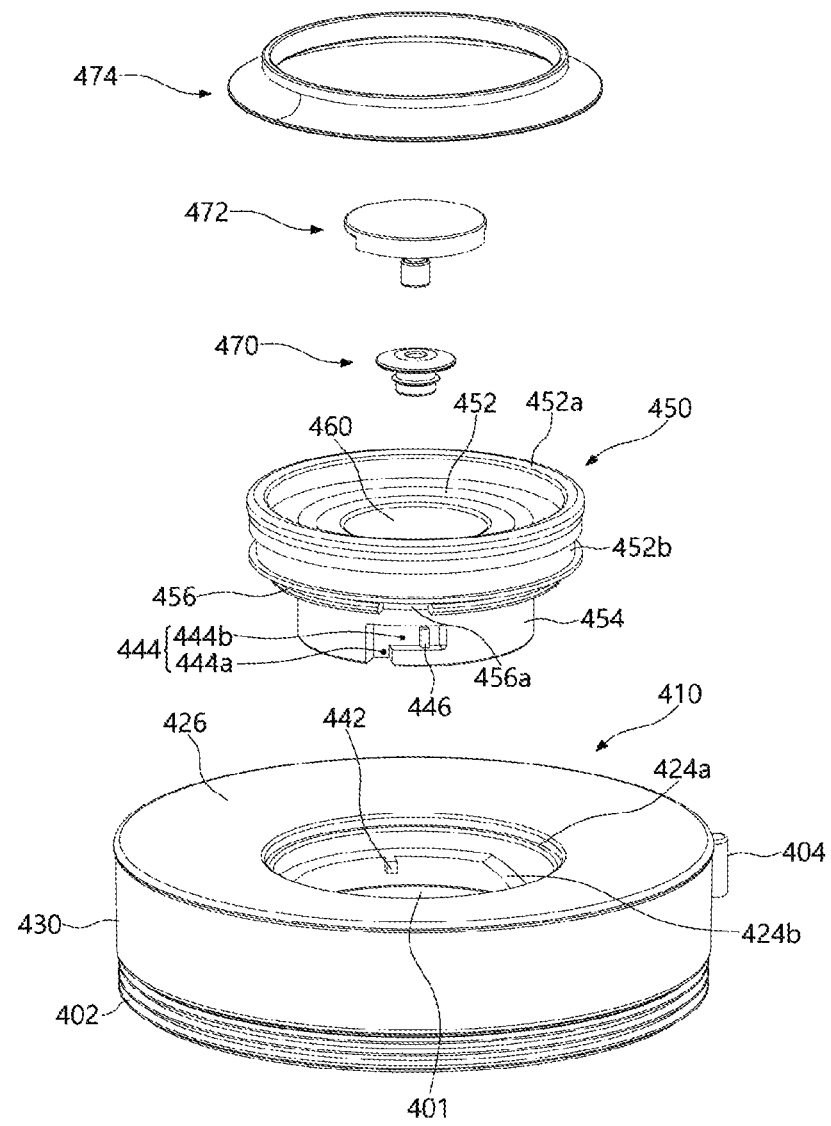

[FIG.17]
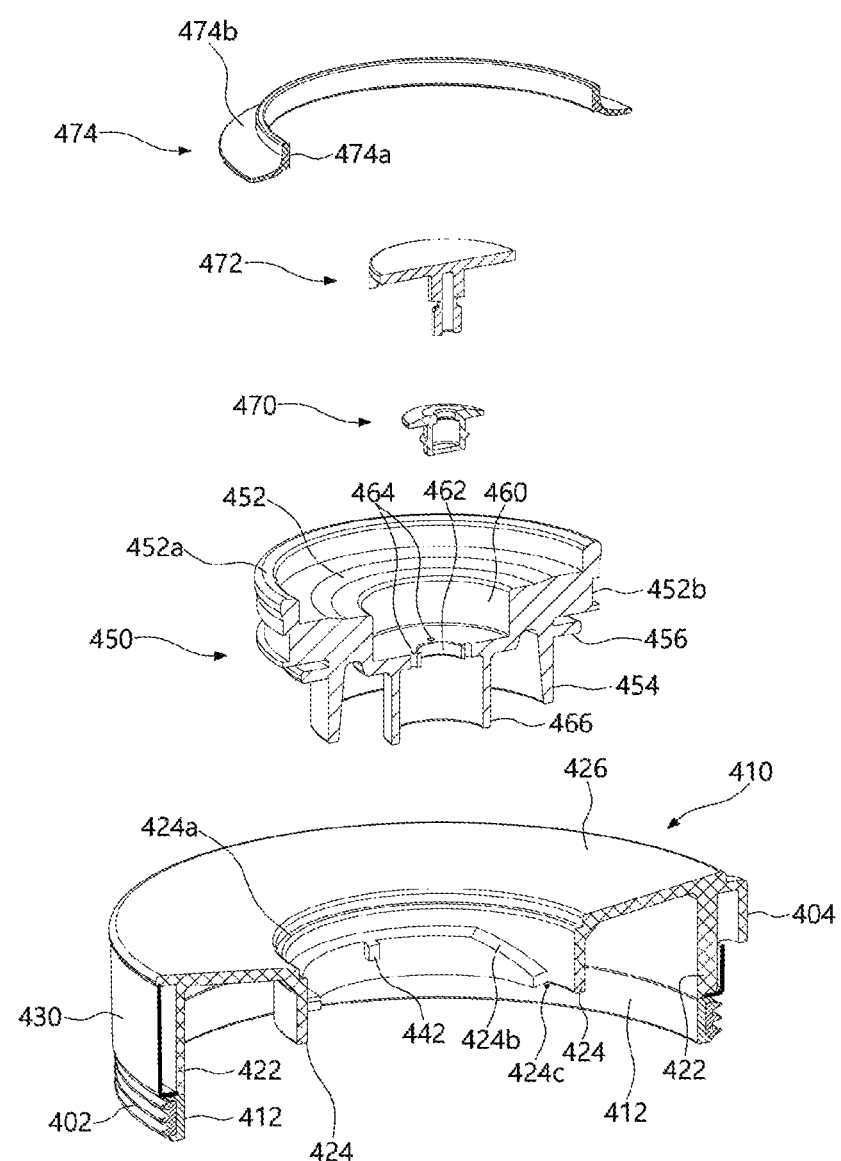

[FIG.18]
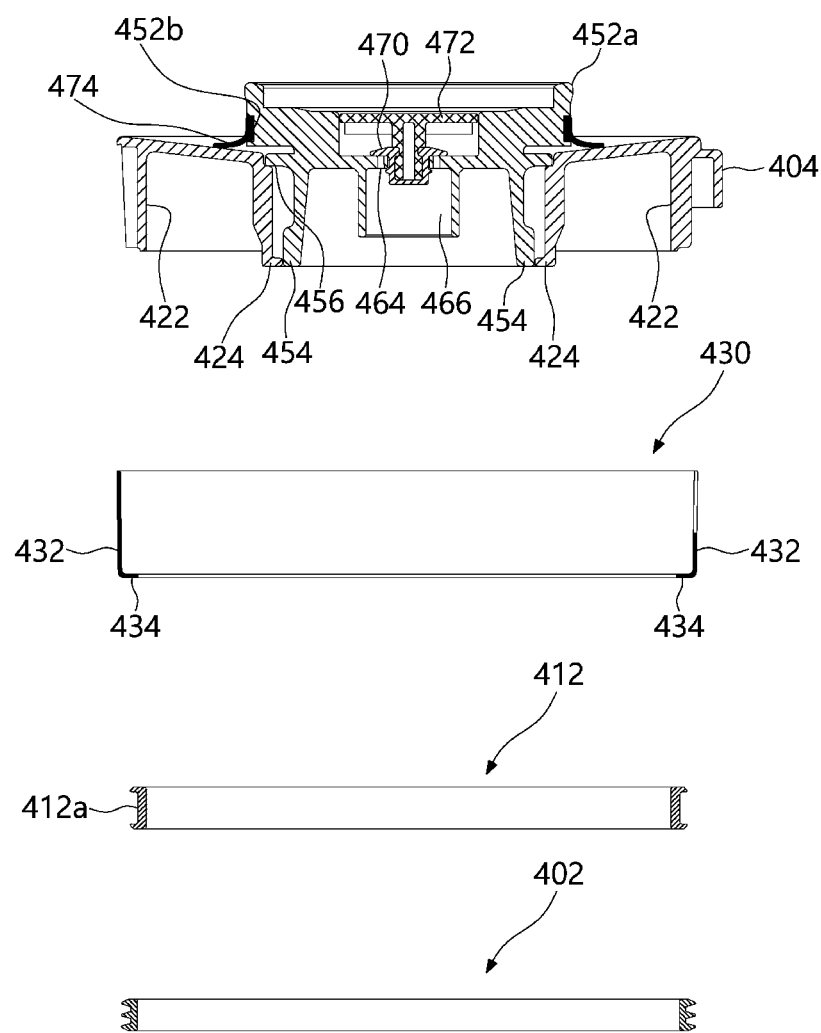

[FIG.19]
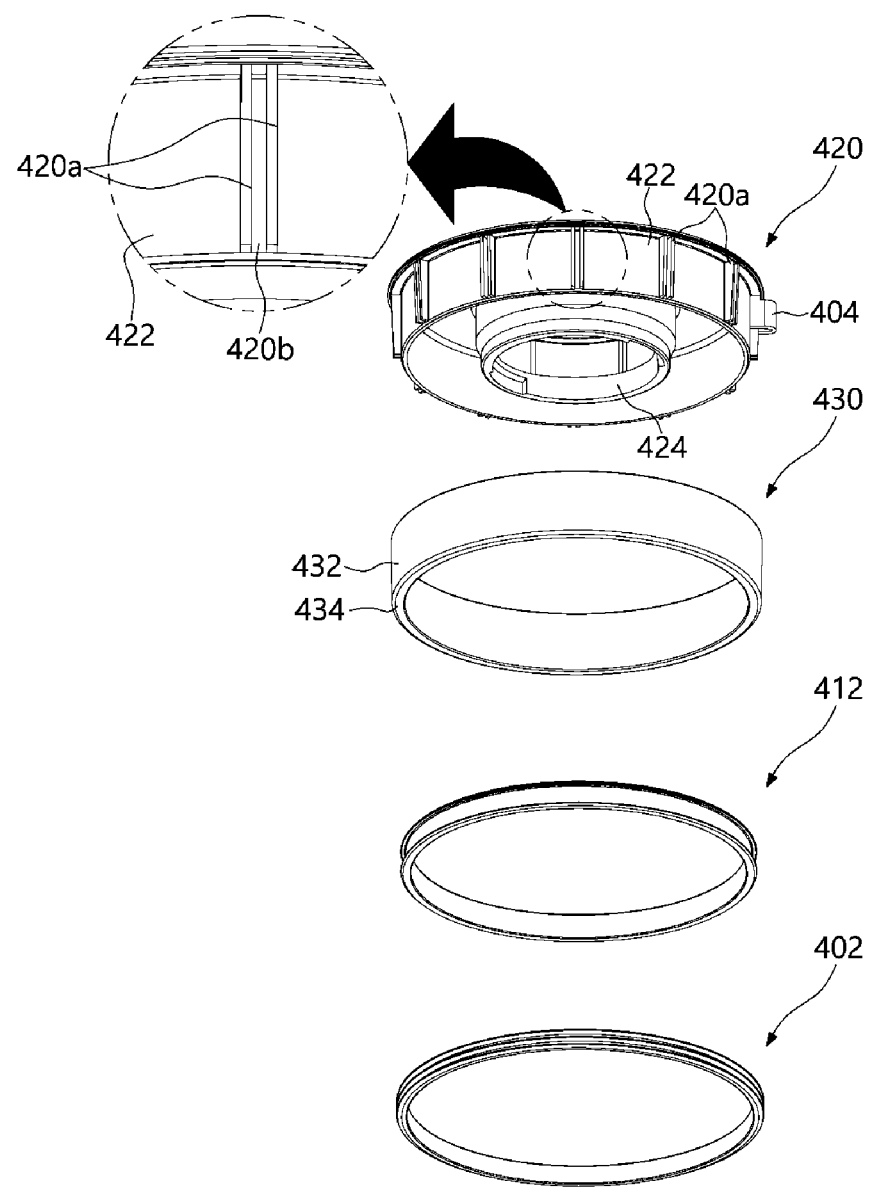

BLENDER

CROSS REFERENCE TO RELATED APPLICATION

The present application claims priority to Korean Patent Application No. 10-2019-0123876, filed Oct. 7, 2019, and to Korean Patent Application No. 10-2019-0127179, filed Oct. 14, 2019, the entire contents of which is incorporated herein for all purposes by this reference.

BACKGROUND OF THE DISCLOSURE

Field of the Disclosure

The present disclosure relates generally to a blender. More particularly, the present disclosure relates to a blender, where an exterior material is provided on the outer surface of a container lid.

Description of the Related Art

Generally, a blender is referred to as a mixer or crusher, and is mainly used for crushing or chopping food contained in a container body by rotating blades powered by a motor.

In a normal blender, a blender body having a motor operated by electricity is located at the lower side of the blender, and the container body receiving food is seated on the upper side of the blender body. Blades crushing or chopping food are provided inside the container body, and are rotated by the rotational force of the motor.

Accordingly, when a user drives the motor by using a manipulation button or a knob of the blender body after putting food in the container body, the blades receiving the rotational force generated by the motor crush or chop food contained inside the container body.

Such a blender has recently been developed in accordance with a desire to facilitate the food intake of office workers due to their busy daily life. That is, a small hand blender has been developed, and a blender has been developed that allows food to be crushed in a larger capacity or at high speed.

A mixer is disclosed in Korean Patent No. 10-1772862. In the document, a blender lid is configured as a separate part. Accordingly, a user is required to open the entirety of the lid to stir food by inserting a mixing rod into the container body or to additionally insert food thereinto. Furthermore, the center of the upper surface of the lid has the shape of a dome protruding slightly, and it is difficult for a user to hold the lid with their hand.

In addition, to process food ingredients contained in a container body of a blender in a fresher state, a vacuum blender, which cuts or crushes food inside the container body in a vacuum state has been disclosed.

For example, the blender provided with a vacuum device is disclosed in Korean Patent No. 10-1769482.

However, even in such a vacuum blender, the lid is configured as a separate part. Accordingly, to insert additional food or a mixing rod into the container body, a user is required to forcibly open the lid coupled to a gasket.

Furthermore, the lid is made of one material such as plastic or is made of the same material as the material of the container body, so the lid looks crude and rough to a user.

SUMMARY OF THE DISCLOSURE

Accordingly, the present disclosure has been made keeping in mind the above problems occurring in the related art, and the present disclosure is intended to propose a blender in which a separate cap may be removably mounted to a container lid.

In addition, the present disclosure is intended to propose a blender in which without opening the container lid, food or a mixing rod may be inserted into a container body.

Furthermore, the present disclosure is intended to propose a blender in which a lid exterior material may be provided on the outer surface of the container lid.

In order to achieve the above objectives, according to one aspect of the present disclosure, there is provided a blender including a container lid to which a separate cap is mounted.

In the present disclosure, a lid exterior material may be provided on the container lid. Accordingly, the blender may have durability and a high quality appearance.

In the present disclosure, the lid exterior material may be coupled to a lid casing by adhesive.

In the present disclosure, a support ring to which a gasket is mounted may be fixed to the lid casing by fusion.

In the present disclosure, the lower part of the lid exterior material may extend up to the upper part of the gasket, and the lower end of such a lid exterior material may be bent inward.

In the present disclosure, a bent part may be formed in the lower end of the lid exterior material by being bent inward therefrom, and such a bent part may be mounted to be in contact with the upper end of the gasket.

In the present disclosure, the gasket may be mounted to the outer surface of the lid casing.

In the present disclosure, a support groove may be formed in the outer surface of the lid casing by being recessed inward therefrom, and the gasket may be mounted to such a support groove.

In the present disclosure, the container lid including the lid casing having the gasket provided on the lower part thereof and the lid exterior material covering at least one surface of the lid casing may be provided, and the support ring may be provided at a side of the lid casing so as to fix and support the gasket.

In addition, in the present disclosure, the gasket blocking a gap between the container lid and a container body, and the support ring fixing and supporting the gasket may be provided at a side of the lid casing.

In the present disclosure, the support ring supporting the gasket may be formed integrally with the lid casing, or may be formed as a structure separate therefrom and be coupled to the lower end of the lid casing.

The blender of the present disclosure may include: the container body configured to receive food; a blender body provided at the lower side of the container body and supporting the container body; and the container lid mounted removably to the upper surface of the container body and opening and closing the upper side of the container body, wherein the lid exterior material may be provided on the container lid to cover the side surface or the upper surface of the container lid.

The container lid may include a lid body having a lid hole vertically formed therethrough, and the cap mounted removably to the lid body and covering the lid hole.

The lid exterior material may cover the side surface of the lid body.

The lid body may include the lid casing having the lid hole formed vertically through the center thereof, and the lid exterior material covering the side surface of the lid casing.

The lid casing may include: an outer wall configured to have the shape of a circular ring and constituting the appearance thereof; an inner wall provided to have a diameter smaller than the diameter of the outer wall and to have the lid hole formed therein; an upper surface connecting the upper ends of the outer wall and the inner wall to each other.

The gasket blocking a gap between the container lid and the container body, and the support ring fixing and supporting the gasket may be provided at a side of the lid casing.

The support ring may be coupled to the lower side of the outer wall, and the gasket may be in close contact with and mounted to the outer surface of the support ring.

The support groove may be formed in the outer surface of the support ring by being recessed inward therefrom, and the gasket may be received and mounted in the support groove.

The lid exterior material may include a side surface part covering the side surface of the lid casing, and the bent part extending by being bent inward perpendicularly to the lower end of the side surface part.

The bent part may be inserted to a position between the lid casing and the support ring.

The upper end of the support ring may be coupled to the lower end of the outer wall by heat fusion.

The lid exterior material may be made of stainless steel.

At least one slit rib may be formed on the side surface of the lid casing by protruding therefrom to the outside.

The slit rib may be configured as a pair of slit ribs, and a gap having a predetermined size may be defined between the pair of slit ribs.

The adhesive may be provided in the gap defined between the pair of slit ribs.

The adhesive may include silicone. Accordingly, the lid exterior material may be easily fixed to the lid casing.

The blender of the present disclosure has the following effects.

First, in the present disclosure, the lid hole may be formed in the center of the container lid by being formed therethrough, and the cap may be provided in such a lid hole. Accordingly, if necessary, even without opening the container lid, the cap may be removed therefrom, so an effect similar to the effect of opening the container lid may be obtained. That is, after the cap is removed from the container lid, food may be inserted into the container body through the lid hole or an instrument such as a mixing rod may be inserted into the container body to stir food inside the container body. Furthermore, when the state of food is required to be measured during the use of the blender, only the cap may be simply removed from the container lid and a measuring instrument may be inserted into the container body to measure the state of the food, thereby improving usability of the blender.

Second, in the present disclosure, the cap may be provided by protruding upward at the center of the container lid. Accordingly, a user may remove or install the container lid by holding the upper end of the cap with their hand without directly holding the edge of the container lid with their hand, thereby improving usability. That is, the cap protruding upward from the container lid may also function as a handle of the container lid, and thus may be convenient to be used.

Third, in the present disclosure, the lid exterior material made of a material such as stainless steel that has a smooth surface, is strong, and is resistant to rust may be provided on the side surface of the container lid. Accordingly, unlike plastic products made of crude materials, even when the container lid is separated from the container body, the container lid may maintain a high-quality image and look beautiful to consumers.

Fourth, in the present disclosure, the slit ribs may be formed on the lid casing, and adhesive such as silicone is filled or applied between such slit ribs. Accordingly, the lid exterior material may be simply fixed to the outer surface of the lid casing.

Fifth, in the present disclosure, the lower end of the lid exterior material mounted to the side surface of the lid casing may be bent inward. Accordingly, the lower end (a sharp edge) of the lid exterior material made of stainless steel may not be exposed to the outside, thereby preventing an injury or accident of a user due to the sharp edge of the lid exterior material.

Sixth, in the present disclosure, when the lower end of the lid exterior material covering the side surface of the outer wall of the lid casing having the slit ribs formed thereon is bent to have the bent part, such a bent part may be inserted to a position between the lid casing and the support ring, and cover the lower ends of the slit ribs. Accordingly, external foreign matter may be prevented from being introduced through gaps between the slit ribs or a gap between the outer wall of the lid casing and the lid exterior material.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 1 is a perspective view illustrating a configuration of a blender according to a first embodiment of the present disclosure;

FIG. 2 is a vertical cross-sectional view illustrating an internal configuration of the blender according to the first embodiment of the present disclosure;

FIG. 3 is an exploded perspective view illustrating a detailed configuration of a container body according to the first embodiment of the present disclosure;

FIG. 4 is a bottom perspective view of the container body according to the first embodiment of the present disclosure;

FIG. 5 is a perspective view of a blender body according to the first embodiment of the present disclosure;

FIG. 6 is an exploded perspective view illustrating a configuration of an upper half part of the blender body according to the first embodiment of the present disclosure;

FIG. 7 is a perspective view illustrating a configuration of the blender body from which a cover is removed according to the first embodiment of the present disclosure;

FIG. 8 is a perspective view illustrating an example of a container lid according to the first embodiment of the present disclosure;

FIG. 9 is a cutaway perspective view illustrating an internal configuration of the container lid illustrated in FIG. 8;

FIG. 10 is a top exploded perspective view illustrating a configuration of the container lid of FIG. 8;

FIG. 11 is a bottom exploded perspective view illustrating a configuration of the container lid of FIG. 8;

FIG. 12 is a cutaway exploded perspective view illustrating an internal configuration of the container lid of FIG. 8;

FIG. 13 is an exploded perspective view illustrating a configuration of a lid body constituting the container lid of FIG. 8;

FIG. 14 is a perspective view of a container lid according to a second embodiment of the present disclosure;

FIG. 15 is a cutaway perspective view illustrating an internal configuration of the container lid illustrated in FIG. 14;

FIG. 16 is an exploded perspective view illustrating a configuration of the container lid illustrated in FIG. 14;

FIG. 17 is a cutaway exploded perspective view illustrating a configuration of the container lid illustrated in FIG. 14;

FIG. 18 is a front cross-sectional view illustrating a state in which a lid exterior material is removed from the container lid illustrated in FIG. 14; and FIG. 19 is a bottom exploded perspective view illustrating a configuration of the lid body illustrated in FIG. 14.

DETAILED DESCRIPTION OF THE DISCLOSURE

Hereinafter, embodiments of a blender of the present disclosure will be described in detail with reference to the accompanying drawings.

FIGS. 1 and 2 are a perspective view and a vertical cross-sectional view, respectively, illustrating a configuration of a blender according to a first embodiment of the present disclosure.

As illustrated in these drawings, the blender of the present disclosure may include a container body 100 located relatively at the upper side thereof and receiving food, and a blender body 500 provided at the lower side of the container body 100 and supporting the container body 100.

The container body 100 may be a part in which food is received and the process of cutting or crushing the food occurs, and the blender body 500 may support the container body 100. Furthermore, multiple parts may be provided inside such a blender body 500 to control the cutting or crushing of the food received in the container body 100, or to supply electric power.

The container body 100 may have a cylindrical shape as a whole, and the upper surface thereof may be configured to be open to introduce food thereinto.

The container body 100 may be made of a transparent material such that the inside thereof can be seen from the outside. That is, the container body 100 may be made of glass or transparent plastic so that a user can check the state of food contained inside the container body 100 from the outside.

A blade assembly 200 may be provided in the inner lower portion of the container body 100. The blade assembly 200 may have multiple blades (206 of FIG. 3) mounted rotatably thereto such that the blades chop or crush food received in the container body 100.

The blade assembly 200 may be connected to a motor assembly 600 to be described below, and be configured to be rotated by the rotational force generated by the motor assembly 600.

The container body 100 may be formed doubly. That is, the container body 100 may be composed of an outer container body 110 constituting the appearance thereof and an inner container body 120 provided inside the outer container body 110. The outer container body 110 and the inner container body 120 may be configured to be in contact with each other or be spaced apart by a predetermined distance from each other. Furthermore, only a portion of each of the outer container body 110 and the inner container body 120 may be configured to be in contact with each other. Of course, the container body could be formed with a single body.

At least one inner guide 122 may be provided in the container body 100 to have a predetermined length in a vertical direction. The inner guides 122 are intended to guide food rotating in the container body 100, and may be configured in pairs symmetrical to each other in the front and rear or left and right of the inner container body 120.

A handle 300 grasped by a user may be formed by protruding from the right surface of the container body 100 to the right side. Such a handle 300 may be formed such that a user can grasp the handle with one hand, and in the present disclosure, the upper end of the handle is illustrated to be connected integrally to the upper surface of the container body 100.

Meanwhile, a spout 210 may be formed at the opposite side to the handle 300.

As illustrated in the drawing, the spout 210 may be formed on the upper end of the left surface of the container body 100, and may be a part through which food completely crushed in the container body 100 is guided to be easily poured to the outside. Accordingly, such a spout 210 may be formed to gradually protrude more in the left direction going upward.

The upper surface of the container body 100 may be covered by a container lid 400. That is, the container lid 400 may be removably mounted to the upper surface of the container body 100, and open and close the upper surface of the container body 100.

The container lid 400 may cover the upper surface of the container body 100 such that food contained in the container body 100 does not splatter to the outside and foreign matter from the outside is not introduced into the container body 100.

The container lid 400 may be configured to be mounted to the container body 100 by pressing or rotating the container lid 400 by a user. A gasket 402 may be provided on the outer circumferential surface of the container lid 400 and block a gap between the container lid 400 and the container body 100. Of course, such a gasket 402 may function to allow the container lid 400 to be pressed and fitted into the container body 100.

A cap 450 may be provided in the container lid 400. That is, a lid hole 401 which is a circular hole having a predetermined size may be formed vertically through the center of the container lid 400, and the cap 450 may be mounted to such a lid hole 401 and cover the lid hole 401.

As illustrated in the drawings, the cap 450 may be installed at the center of the container lid 400, and as a whole, may be formed to have a diameter smaller than the diameter of the container lid 400. The cap 450 may be removably mounted to the container lid 400 through forcible fitting by pressing or by rotating.

In the present disclosure, it is illustrated that the cap 450 is configured to be attached and detached from the container lid 400 by being rotated, and a detailed configuration thereof will be described below.

Since the cap 450 may be removably mounted to the container lid 400, a user may see food contained inside the container body 100 by opening only the cap 450 without opening the container lid 400, and insert food into the container body 100 by opening the cap 450, or insert a mixing rod thereinto and stir the food contained inside the container body 100.

The upper end of the cap 450 may be configured by protruding toward a side upper than the upper end of the container lid 400, so that the cap 450 may function as a handle of the container lid 400 to be grasped by a user when the user opens or closes the container lid 400.

As illustrated in the drawings, the blender body 500 may be configured to have a hexahedral shape having the shape of a rectangular box as a whole and be provided under the container body 100 so as to support the container body 100, wherein the motor assembly 600 and multiple electronic parts such as a PCB (a printed circuit board) may be installed inside the blender body 500. Of course, the external shape of such a blender body 500 may be variously changed as required.

The motor assembly 600 may be provided at the center of the inside of the blender body 500. The motor assembly 600 may generate a rotational force by power supplied from the outside so that the blades 206 constituting the blade assembly 200 rotate.

Accordingly, the lower end of the blade assembly 200 may be connected to the upper end of the motor assembly 600.

A knob 502 may be provided on the front surface of the blender body 500 by protruding forward therefrom. The knob 502 is intended to set the operation of the blender of the present disclosure, and may be rotatably mounted to the blender body 500.

The knob 502 may be configured to control the operation intensity of the motor assembly 600. That is, the knob 502 may be configured to change the rotational speed of the motor assembly 600 to high speed or low speed by the clockwise or counterclockwise rotation of the knob 502.

Meanwhile, a manipulation part 504 may be provided on the upper surface of the blender body 500.

The manipulation part 504 is intended to manipulate the blender of the present disclosure by touching, and may be configured to manipulate the starting and stopping of the operation of the blender.

Of course, the knob 502 and the manipulation part 504 may be configured to selectively set or manipulate the operation of the blender, or may be configured to overlap each other in the functions of the setting and manipulating. That is, for convenience, the knob 502 and the manipulation part 504 may be configured to overlap each other in the functions such that a user may select any one of the knob 502 or the manipulation part 504 to set or manipulate the operation of the blender.

A display part 506 may be provided at a side of the manipulation part 504 (a left side of FIG. 1). That is, the display part 506 may be provided on the upper surface of the blender body 500. Such a display part 506 may function to display the state of the operation of the blender such that a user can check the state thereof. Accordingly, such a display part 506 may be configured as a seven-segment display.

A cooling fan 610 may be provided at the lower side of the motor assembly 600.

The cooling fan 610 may be connected to the lower end of the motor assembly 600 and be rotated by a rotating force generated by the motor assembly 600, thereby introducing an outside air into the blender body 500 and forcing the flow of the air. Accordingly, the cooling fan 610 may allow air to be introduced into the blender body 500 from the outside and to flow therein, and function to cool parts such as the PCB provided in the blender body 500.

A base end 510 may be provided on the lower surface of the blender body 500.

The base end 510 may be formed by protruding downward from the lower surface of the blender body 500 and, in one embodiment, may have a space having a predetermined size therein to receive a wireless power module 520. The wireless power module 520 may function to receive external wireless power in a wireless method using induced electromotive force and to supply the wireless power to the motor assembly 600 provided inside the blender body 500.

Meanwhile, a detection system may be provided in the blender body 500 and the container body 100 described above so as to detect whether the container lid 400 is mounted to the container body 100.

The detection system may allow an electric circuit (not shown) which can be turned on and off to be formed in the container body 100, and allow such an electric circuit to form a closed circuit, so that the detection system may be configured to detect whether electric current flows in the closed circuit by voltage supplied by the blender body 500.

More particularly, the detection system may include: a power transmission means 700 provided in the blender body 500 and supplying power to the container body 100; a power reception means 220 provided in the container body 100 and receiving the power supplied by the power transmission means 700; an on/off means 230 provided at the upper side of the container body 100 and turning on/off the electric circuit formed in the container body 100 depending on whether the container lid 400 is closed; a transparent electrode film 240 made of a transparent material provided on a surface of the container body 100 and connecting the power reception means 220 and the on/off means 230 to each other so as to allow electricity to flow therebetween; and a detection means 800 provided on one side of the blender body 500 or the container body 100 and allowing the electric circuit formed by the connection of the power reception means 220 with the on/off means 230 to form the closed circuit so as to detect whether the current flows.

The power transmission means 700 is intended to transmit power, which is introduced to the blender body 500 from the outside of the blender body 500 or stored in advance in the blender body 500, to the container body 100, and may use an inductive coil in which the induced electromotive force can be generated.

The power reception means 220 is intended to receive the power transmitted from the blender body 500, and may be configured to have a structure corresponding to the structure of the power transmission means 700. That is, the power reception means 220 may use an inductive coil such that the power is transmitted by the induced electromotive force generated between the power transmission means 700 and the power reception means 220.

The power transmission means 700 and the power reception means 220 may be located to be adjacent to each other so as to generate the induced electromotive force. Accordingly, in the present disclosure, the power transmission means 700 is illustrated to be mounted to the right upper end of the blender body 500, and the power reception means 220 is illustrated to be mounted to the right lower end of the container body 100.

The on/off means 230 may be configured to turn on/off the electric circuit (not shown) formed in the container body 100 depending on whether the container lid 400 is mounted to the container body 100, and may include a permanent magnet 232 and a reed switch 234 provided in the container lid 400 and the container body 100, respectively.

As illustrated in FIG. 2, in the present disclosure, the permanent magnet 232 is illustrated to be mounted to the right edge of the container lid 400, and the reed switch 234 is illustrated to be mounted to the left upper end (a portion of the handle) of the container body 100.

More particularly, the reed switch 234 may be mounted to be received in a reed switch groove 236 formed in the upper end portion of the handle 300.

It is widely known that the reed switch has magnetic movable contacts enclosed in a glass tube, and when a magnet approaches the reed switch, the contacts in the glass tube contact with each other. Here, further detailed description of the configuration and principle of the reed switch will be omitted.

Of course, except for the use of the permanent magnet 232 and the reed switch 234 of such an on/off means 230, other electric on/off means or mechanical structures may be used to turn on/off the electric circuit, and the mounting positions of the permanent magnet 232 and the reed switch 234 respectively mounted to the container lid 400 and the container body 100 may be exchanged oppositely.

Various types of electrical devices or structures having a function that can detect whether electric current flows in the electric circuit formed in the container body 100 turned on/off by the on/off means 230 may be used as the detection means 800. However, in the present disclosure, a photodetector is used to detect light as an example.

Accordingly, the detection means 800 may include a light transmission module 810 provided in the container body 100 to generate light, and a light reception module 820 provided in the blender body 500 to receive the light transmitted by the light transmission module 810.

The light transmission module 810 and the light reception module 820 may be located at positions adjacent to each other. In the present disclosure, as illustrated in FIG. 2, the light transmission module 810 may be located on the left lower end of the container body 100, and the light reception module 820 may be located on the left upper end of the blender body 500.

The light transmission module 810 may use a light emitting diode (LED) that emits light by electricity, and the light reception module 820 may use the photodetector that receives light and changes the light into an electrical signal.

In addition, the transparent electrode film 240 may be provided between the outer container body 110 and the inner container body 120. More particularly, the transparent electrode film 240 may be attached to the inner surface of the outer container body 110.

The transparent electrode film 240 may be made of a transparent material such as an ITO film (an indium-tin oxide film) and may be attached to the surface of the container body 100, and may allow the on/off means 230 provided on the upper side of the container body 100 to be connected to the power reception means 220 and the light transmission module 810 provided on the lower end portion of the container body 100 so as to form the electric circuit.

Accordingly, the transparent electrode film 240 may be attached vertically and longitudinally on the surface of the container body 100 made of a transparent material and may function to guide the transmission of the electrical signal between the upper end and lower end of the container body 100.

Accordingly, when the container body 100 is made of the transparent material, and the transparent electrode film 240 is also made of the transparent material, the transparent electrode film 240 may not be visually exposed, so that the transparent material does not damage the appearance of the container body 100 and may maintain the design thereof.

Furthermore, when the transparent electrode film 240 is attached to the surface of the container body 100, the transparent electrode film 240 may have a hole formed therein to remove air bubbles that may be generated between the attached surfaces. That is, a perforated hole may be added to the center of the transparent electrode film 240 made of the ITO film to allow the air bubbles to escape therethrough such that the generation of the air bubbles is prevented.

Meanwhile, a seating step 900 may be formed on the upper surface of the blender body 500 by protruding upward therefrom.

The seating step 900 may be configured to have a circular shape corresponding to the shape of the lower end of the container body 100 such that the lower end of the container body 100 is mounted to the seating step 900 to be vertically removed therefrom.

In addition, the container body 100 may be formed doubly. That is, the container body 100 may be composed of the outer container body 110 and the inner container body 120, and the inner guide 122 may be formed on the inner surface of the inner container body 120 by protruding inward therefrom.

Hereinafter, the configuration of the container body 100 will be described in detail.

FIG. 3 is an exploded perspective view of the container body 100, and FIG. 4 is a bottom perspective view of the container body 100.

As illustrated in these drawings, the container body 100 may be doubly configured to have a cylindrical shape as a whole. That is, the container body 100 may include the outer container body 110 constituting the appearance thereof, and the inner container body 120 provided inside the outer container body 110.

The container body 100, that is, the outer container body 110 and the inner container body 120 may be made of a transparent material. That is, the container body 100 may be made of a transparent material such as glass, tritan, or transparent plastic so that a user can check the state of the food contained inside the container body 100 from the outside.

The outer container body 110 may constitute the appearance of the container body, and be configured to have a cylindrical shape with the same top and bottom sizes, and a main handle 302 may be formed at the outer right surface thereof by protruding therefrom to the right such that a user can grasp the handle.

The main handle 302 may be formed to have an L shape, and the upper end portion thereof may be connected to the right upper end of the outer container body 110. The main handle 302 may be formed integrally with the outer container body 110 by injection molding. Accordingly, the main handle 302 formed integrally with the outer container body 110 may have improved strength and durability compared to the main handle formed as a part separate from the outer container body 110 to be fixed thereto.

The reed switch groove 236 receiving the reed switch 234 may be formed in a portion at which the main handle 302 is connected to the container body 100. That is, the reed switch groove 236 may be formed in the upper end of the main handle 302, and may provide space to mount the reed switch 234 therein, and the left of such a reed switch groove 236 may be open.

An outer handle 304 and an inner handle 306 may be provided on the outer sides of the main handle 302. That is, as illustrated in FIG. 3, the outer handle 304 may be provided at the right of the main handle 302, and the inner handle 306 may be provided at the left of the main handle 302.

More particularly, the outer handle 304 may also be configured to have an L shape as a whole like the main handle 302, to cover the upper surface, right surface, and front and rear surfaces of the main handle 302. The outer handle 304 may be made of a material such as stainless steel that has a smooth surface and is resistant to rust, and may not break easily and look beautiful to a user.

The inner handle 306 may cover the left surface and lower surface of the main handle 302, and may be configured to have an L shape so as to correspond to the left and lower surfaces of the main handle 302, and at least a portion thereof may be made of an elastic material.

Particularly, the inner handle 306 may include a connection part 306a covering the lower part of the upper end of the main handle 302, and a grasping part 306b extending downward from the connection part 306a and covering the left surface of the main handle 302.

Like the outer handle 304, the connection part 306a may be made of a smooth and strong material, and the grasping part 306b may be a part on which a user's fingers are wrapped, and be made of an elastic material. That is, the connection part 306a may be made of stainless steel, and the grasping part 306b may be made of an elastic material such as rubber that can give a user a soft touch since the four fingers (except for the thumb) of the user cover the grasping part.

The inner container body 120 may be configured to have size (a diameter) smaller than the size (a diameter) of the outer container body 110 and may sit inside the outer container body 110.

The inner container body 120 may be configured to have a cylindrical shape having an open upper part. More particularly, as illustrated in the drawings, the inner container body 120 may be configured to have a tapered shape having a diameter gradually decreasing toward the lower side thereof.

In addition, the multiple inner guides 122 may be vertically formed on the inner surface of such an inner container body 120 as described above, and the blade assembly 200 may be mounted to the lower end of the inner container body 120.

The spout 210 may be formed on the left upper end of the inner container body 120 by protruding therefrom to the left, and a covering end 124 may be formed on the right upper end of the inner container body 120 by extending therefrom to the right.

The covering end 124 may cover the upper surface of the reed switch groove 236 of the outer container body 110. The covering end 124 may be configured to be a flat plate having a predetermined thickness, and to have a width gradually decreasing toward the right to correspond to the size of the upper end of the reed switch groove 236.

The blade assembly 200 may be mounted to the lower end of the inner container body 120.

The blade assembly 200 is intended to allow food to be finely crushed or mixed by the blades, and may include: a blade shaft 202 rotating by receiving the rotational force generated from the motor assembly 600; a blade body 204 provided at the outside of the blade shaft 202 and supporting the blade shaft 202; and at least one blade 206 connected to the blade shaft 202 and crushing food by rotating.

A magnet holder 404 may be provided on the outer circumferential surface of the container lid 400. That is, as illustrated in FIG. 3, the magnet holder 404 may be formed on the outer circumferential surface of the container lid 400 by protruding therefrom to the outside, and have the permanent magnet 232 mounted therein.

The permanent magnet 232 is intended to control the turning on/off of the reed switch 234 when the container lid 400 is mounted to or removed from the container body 100.

A coil holder assembly may be provided between the outer container body 110 and the inner container body 120.

The coil holder assembly may include a coil holder 130 having an inductive coil, and an upper cover 140 and a lower cover 150 covering the upper and lower sides of the coil holder 130, respectively.

Particularly, the coil holder 130 may be provided between the bottom surface of the outer container body 110 and the lower surface of the inner container body 120, and the power reception means 220 and the light transmission module 810 may be mounted to such a coil holder 130.

The entirety of the coil holder 130 may have the shape of a circular ring having a predetermined thickness, and the power reception means 220 may be provided at the right end of the coil holder 130 having such a ring shape. That is, although not shown in detail, the inductive coil which receives power may be provided at the right end of the coil holder 130, and constitute the power reception means 220.

The power reception means 220 mounted to the coil holder 130 may be embodied with the reception inductive coil patterned on the same plane as the PCB. That is, in the power reception means 220 according to the first embodiment of the present disclosure, the reception inductive coil provided on the lower surface of the coil holder 130 may be configured to be wound multiple times on the PCB in a spiral shape relative to a reception center point.

In addition, the light transmission module 810 may be provided on the lower surface of the coil holder 130.

The light transmission module 810 may emit light by power supplied from the power reception means 220. The light transmission module 810 may be configured as a part of the detection means 800, and use the LED emitting light as described above.

The power reception means 220 and the light transmission module 810 may be electrically connected to each other. That is, the power reception means 220 and the light transmission module 810 may be configured to form the closed circuit in cooperation with the on/off means 230. Accordingly, the power reception means 220 and the light transmission module 810 provided in the coil holder 130, and the on/off means 230 may be configured to be electrically connected to each other by the PCB.

In addition, although not shown, the coil holder 130 may further include a conversion module that converts alternating current (AC) to direct current (DC).

A holder terminal 132 may be provided on the upper surface of the right end of the coil holder 130.

The holder terminal 132 may be a part to which the lower end of the transparent electrode film 240 is inserted and connected.

As illustrated in FIG. 3, the coil holder 130 may be configured to have an approximate ring shape as a whole, and the right end of the coil holder 130 may be configured to be relatively large in width such that the power reception means 220 may be mounted thereto.

Multiple grooves may be formed in the outer circumferential surface and inner circumferential surface of the coil holder 130 such that hooks fixing multiple parts pass therethrough.

The coil holder 130 may be protected by the upper cover 140 and the lower cover 150. That is, the upper cover 140 and the lower cover 150 may be provided on the upper surface and lower surface of the coil holder 130, respectively, so as to cover the upper surface and lower surface thereof, the upper cover and lower cover having shapes corresponding to the upper surface and lower surface of the coil holder 130, respectively.

A terminal holder 142 may be formed on the right end of the upper cover 140 by protruding upward therefrom to receive the holder terminal 132 of the coil holder 130 therein. Accordingly, the holder terminal 132 may be received in the terminal holder 142 by being introduced thereto from the lower side of the terminal holder 142, and the upper part of such a terminal holder 142 may be formed to be partially open such that the lower end of the transparent electrode film 240 passes therethrough.

The hooks may be formed on the upper cover 140 such that the upper cover 140 is coupled to the lower cover 150.

As described above, the transparent electrode film 240 may be made of a transparent material such as the ITO film, and may be configured to have a length corresponding to the vertical length of the container body 100.

The transparent electrode film 240 may be provided between the outer container body 110 and the inner container body 120. Accordingly, when the transparent electrode film 240 is provided between the outer container body 110 and the inner container body 120, the transparent electrode film 240 may be prevented from being in contact with food contained in the inner container body 120, and may be prevented from being in contact with foreign matter outside of the outer container body 110.

The transparent electrode film 240 may be attached to the surface of the outer container body 110, or the surface of the inner container body 120. That is, the transparent electrode film 240 may be attached to the inner surface of the outer container body 110 or the outer surface (an outer circumferential surface) of the inner container body 120.

Here, the transparent electrode film 240 attached vertically to the inner surface of the outer container body 110 will be described as an example.

As is illustrated in FIG. 3, the upper and lower ends of the transparent electrode film 240 may be bent at least one time. The lower end of the transparent electrode film 240 may pass through the terminal holder 142 of the upper cover 140 and be connected to the holder terminal 132 of the coil holder 130, and the upper end of the transparent electrode film 240 may be connected to the reed switch 234.

A film guide may be formed vertically on the inner surface of the outer container body 110 to attach the transparent electrode film 240 thereto. That is, the film guide may be formed vertically and longitudinally on the right inner surface of the outer container body 110 and may guide the attachment of the transparent electrode film 240.

A magnet groove 126 may be formed in the upper end of the inner container body 120 by being recessed therefrom to the outside so as to receive the permanent magnet 232 therein. That is, the upper end of the right surface of the inner container body 120 may be bent to be stepped to the right so as to form the magnet groove 126, and such a magnet groove 126 may be a part in which the permanent magnet 232 is located.

Meanwhile, the lower surface of the container body 100 may be configured to have a shape corresponding to the shape of the upper surface of the blender body 500 such that the container body 100 may be easily attached to and detached from the upper surface of the blender body 500.

More particularly, the container body 100 may be mounted to the seating step 900 of the blender body 500 to be described below.

Accordingly, the lower surface of the container body 100 may be configured to have a shape corresponding to the shape of the upper end of the blender body 500, so that the container body 100 may be stably mounted to and removed from the blender body 500.

A container body end 170 having a predetermined width may be formed on the lower surface of the container body 100 by protruding downward therefrom. The container body end 170 may be a part which is in contact with the upper surface of a lower step 910 of the blender body 500 to be described below, and may be configured to have a shape corresponding to the upper surface of the lower step 910.

An upper step receiving groove 172 may be formed in the center of the lower surface of the container body 100 by being recessed upward therefrom. That is, the upper step receiving groove 172 may be formed by being recessed upward at the inner side of the container body end 170 of the container body 100. When the container body 100 is mounted to the blender body 500, an upper step 920 of the blender body 500 to be described below may be received in such an upper step receiving groove 172.

The container body end 170 may have the shape of a circular ring having a partially open part, and the open part may be a part in which a coil seating part 940 to be described below is received. That is, the right end of the container body end 170 may be open and a coil seating part groove 170a may be formed therein. The coil seating part 940 to be described below may be received in such a coil seating part groove 170a.

A circular end 174 may be formed on the center of the lower surface of the container body 100 by protruding downward therefrom. That is, the circular end 174 protruding downward may be provided in the center of the upper step receiving groove 172.

As illustrated in FIG. 4, the circular end 174 may have the shape of a circular ring and be hollow therein, which may provide a passage connecting the blade assembly 200 to the motor assembly 600.

The circular end 174 may be a part received in a circular end receiving groove 980 formed in the blender body 500 to be described below.

Multiple mounting protrusions 174a may be formed on the outer circumferential surface of the circular end 174 by protruding radially therefrom. Each of the mounting protrusions 174a may function to tightly mount the container body 100 to the corresponding position of the blender body 500 such that the container body 100 is not rotated. The mounting protrusion 174a may have at least one mounting protrusion 174a.

In the present disclosure, the mounting protrusion 174a is illustrated to have four mounting protrusions 174a. As illustrated in FIG. 4, such a mounting protrusion 174a may be formed to have thickness gradually decreasing toward the outside. This is intended to easily receive the mounting protrusions 174a in protrusion grooves 982 to be described below.

In FIGS. 5 to 7, a configuration of the upper half part of the blender body 500 is illustrated in detail. That is, FIG. 5 is a perspective view of the blender body 500; FIG. 6 is an exploded perspective view illustrating the configuration of the upper half part of the blender body 500; FIG. 7 is a perspective view illustrating a configuration of the blender body 500 from which the cover is removed.

As illustrated in these drawings, the seating step 900 may be provided on the upper surface of the blender body 500 by protruding therefrom to be stepped upward such that the lower surface of the container body 100 is seated thereon.

The seating step 900 may be a part by which the lower end of the container body 100 is seated and be supported. Accordingly, such a seating step 900 may be configured to have shape corresponding to the shape of the lower part of the container body 100.

Particularly, the seating step 900 may be formed by being stepped, and may include the lower step 910 having a diameter corresponding to the diameter of the lower end of the container body 100, and the upper step 920 formed by protruding upward from the lower step 910 and having a diameter smaller than the diameter of the lower step 910.

As illustrated in the drawing, the lower step 910 may be configured to have a circular shape and a predetermined height, and the upper step 920 having a diameter smaller than the diameter of the lower step 910 may be formed on the upper part of such a lower step 910 by protruding upward therefrom to have a predetermined height. Accordingly, a horizontal step surface 902 may be formed between the lower step 910 having the larger diameter and the upper step 920 having the smaller diameter.

An lower step ring 912 and an upper step ring 914 having shapes corresponding to the outer surfaces of the lower step 910 and the upper step 920, respectively, may be provided on the outer surfaces of the lower step 910 and the upper step 920, respectively. That is, the lower step ring 912 and the upper step ring 914 may be provided on the outer circumferential surfaces of the lower step 910 and the upper step 920, respectively, which have the outer surfaces of circular shapes, and may cover the outer surfaces (side surfaces) of the lower step 910 and the upper step 920.

The lower step ring 912 and the upper step ring 914 may protect parts thereinside and may function as exterior materials. Accordingly, like the outer handle 304, the lower step ring 912 and the upper step ring 914 may be made of a material such as stainless steel which has a smooth surface and is resistant to rust.

In addition, an elastic member 930 made of an elastic material may be provided on the step surface 902 provided between the upper step 920 and the lower step 910. As illustrated in the drawing, the elastic member 930 may be configured to cover the step surface 902 formed on the upper surface of the lower step 910, and to cover the lower half part of the upper step 920.

The elastic member 930 may be made of an elastic material, and thus may function to buffer impact which may be generated when the container body 100 sits on the blender body 500. That is, when the lower surface of the container body 100 sitting on the upper step 920 is in contact with the upper step 920, the elastic member 930 may function to prevent breakage or noise that may occur due to the collision of the lower surface of the container body 100 with the upper step 920 and the lower step 910 of the blender body 500, which are made of solid materials.

Accordingly, the elastic member 930 may be made of a material such as rubber, and may function to make the seating of the container body 100 efficient. Further, the elastic member 930 may be made of a conductive rubber when required, and in this case, the conductive rubber may be provided even on the lower surface of the container body 100.

The power transmission means 700 and the light reception module 820 may be mounted to the upper surface of the upper step 920.

Particularly, the coil seating part 940 may be formed on the right surface of the upper step 920 by protruding therefrom to the right, and the power transmission means 700 may be mounted to the upper surface of such a coil seating part 940.

The power transmission means 700 may be located to be adjacent to the power reception means 220 provided in the container body 100, and may function to supply power to the power reception means 220. Accordingly, such a power transmission means 700 may be configured as an inductive coil. That is, like the power reception means 220, the inductive coil may be configured by being wound multiple times on the same plane, such as a PCB, in a spiral shape relative to a transmission center point (not shown).

In addition, although not shown in detail, the blender body 500 may have an oscillation circuit part therein. Such an oscillation circuit part may generate current and apply the current to the power transmission means 700. Accordingly, a magnetic field may be formed in the power transmission means 700 by the applied current. Furthermore, the oscillation circuit part may change the intensity of the current applied to the power transmission means 700, and thus the magnetic field may be changed in the power transmission means 700 by the change of the current intensity.

Accordingly, as in the present disclosure, with the power reception means 220 and the power transmission means 700 installed to vertically correspond to each other, as the intensity of current applied to the power transmission means 700 changes, the magnetic field of the power transmission means 700 may be changed, and a magnetic flux passing through the power reception means 220 may be changed due to inductive coupling between the power transmission means 700 and the power reception means 220, so the induced electromotive force may be generated in the power reception means 220. Furthermore, such an induced electromotive force may be supplied to the light transmission module 810.

The light reception module 820 may be provided at a side opposite to the power transmission means 700. That is, the light reception module 820 may be mounted in a receiving groove 822 formed in the left end of the upper surface of the upper step 920, which is a position vertically corresponding to the light transmission module 810 mounted to the container body 100.

Particularly, the receiving groove 822 having a predetermined size may be formed in the left end of the upper surface of the upper step 920 by being depressed therefrom, and the light reception module 820 may be mounted in such a receiving groove 822.

As described above, the light reception module 820 may include the photodetector. The light reception module 820 may receive light transmitted by the light transmission module 810, and transmit a light reception signal.

In addition, a Hall sensor 950 and a container body detection switch 960 may be provided on the upper surface of the upper step 920. That is, a container body switch groove 962 and a sensor groove 952 may be formed in the front end portion and rear end portion of the upper surface of the upper step 920, respectively, by being depressed therefrom, and the container body detection switch 960 and the Hall sensor 950 may be mounted in the container body switch groove 962 and the sensor groove 952, respectively.

The container body detection switch 960 may be configured as a reed switch, and may detect whether the container body 100 is seated on the upper surface of the blender body 500. When such a container body detection switch 960 is provided, a magnet corresponding thereto may be provided on the lower end of the container body 100.

The Hall sensor 950 is intended to determine the type of the container body 100 sitting on the blender body 500, and even in this case, a signal transmission means corresponding thereto may be required on the lower surface of the container body 100.

The upper step ring 914 mounted to the edge of the upper step 920 may be configured to be divided into two parts. That is, as illustrated in FIG. 6, the upper step ring 914 may include a protruding piece 916 covering the outer surface of the coil seating part 940 formed on the right surface of the upper step 920 by protruding therefrom to the right, and a curved piece 918 covering the remaining outer surface of the upper step 920.

Meanwhile, the upper part of the upper step 920 may be covered by a cover 970. Accordingly, the power transmission means 700, the light reception module 820, the container body detection switch 960, and the Hall sensor 950 mounted to the upper step 920 may be covered and protected by the cover 970.

In addition, the seating step 900 may have a center vertically formed therethrough such that the blade assembly 200 of the container body 100 and the motor assembly 600 provided in the blender body 500 may be connected to each other.

More particularly, the circular end receiving groove 980 may be formed in the center portion of the upper step 920 by being depressed therefrom, and the circular end 174 of the lower end of the container body 100 described above may be received in such a circular end receiving groove 980. That is, the upper step 920 may have the shape of a circular ring as a whole, and the circular end receiving groove 980 having a circular shape may be formed in the center portion of such an upper step 920.

At least one protrusion groove 982 may be formed in the inner surface of the upper step 920. The protrusion groove 982 may be formed by being depressed radially from the circular end receiving groove 980, and the mounting protrusions 174a of the container body 100 may be seated in the protrusion grooves 982.

Accordingly, the protrusion grooves 982 may be configured to have the size and number thereof corresponding to the size and number of the mounting protrusions 174a, and the size of the width of the protrusion groove 982 may be configured to be the same as or larger than the size of the width of the mounting protrusion 174a.

FIGS. 8 to 13 illustrate a detailed configuration of the container lid 400. That is, FIGS. 8 and 9 are a perspective view and a cutaway perspective view of the container lid 400, respectively; FIGS. 10 and 11 are a top exploded perspective view and a bottom exploded perspective view of the container lid 400, respectively; FIG. 12 illustrates a cutaway exploded perspective view of the container lid 400; and FIG. 13 illustrates an exploded perspective view of a lid body 410 of the container lid 400.

As illustrated in these drawings, the container lid 400 may include: the lid body 410 having the lid hole 401 vertically formed therethrough; the cap 450 covering the lid hole 401; and a locking means 440 allowing the cap 450 to be removably mounted to the lid body 410.

Particularly, the lid body 410 may be configured to have the shape of a circular ring and have the lid hole 401 vertically formed through the inner center thereof. In addition, the cap 450 may be removably mounted to such a lid hole 401, and open and close the lid hole 401.

The lid body 410 may include a lid casing 420 having the lid hole 401 vertically formed through the center thereof, and a lid exterior material 430 covering a side surface of the lid casing 420.

That is, the container lid 400 may include the lid casing 420 having the gasket 402 provided at the lower part thereof, and the lid exterior material 430 covering at least one surface of the lid casing 420. Furthermore, the lower part of such a lid exterior material 430 may extend up to the upper part of the gasket 402, and the lower end of the lid exterior material 430 may be formed by being bent inward.

Multiple slit ribs 420a may be formed on the side surface of the lid casing 420 by protruding therefrom to the outside such that the lid exterior material 430 and the lid casing 420 are coupled to each other.

The slit ribs 420a may be configured in pairs, and a slit which is a gap having a predetermined size may be defined between each of such pairs of slit ribs 420a. Adhesive or an elastic material such as silicone may be applied to or fill such a slit such that the lid exterior material 430 and the lid casing 420 are coupled to each other.

Of course, the slit ribs 420a may protrude from the side surface of the lid casing 420 to the outside, so that the lid exterior material 430 and the lid casing 420 may be coupled to each other by forcible fitting.

The lid casing 420 may constitute the approximate appearance and overall frame of the lid body 410. Such a lid casing 420 may have the lid hole 401 therein vertically formed therethrough and having a diameter of a predetermined size In addition, the lid exterior material 430 may be coupled to the outer surface of the lid casing 420 such that the appearance thereof looks high quality and beautiful to a consumer. That is, the lid casing 420 may be made of plastic by injection molding, and the lid exterior material 430 may be made of a material such as stainless steel.

Accordingly, the lid exterior material 430 may be made of a material such as stainless steel which has a smooth surface and is resistant to rust.

The lid exterior material 430 may be coupled to the outer circumferential surface (a side surface) of the lid casing 420 by adhesive or by forcible fitting. Accordingly, as illustrated in the drawings, the multiple slit ribs 420a may be formed at same intervals on the outer circumferential surface (the side surface) of the lid casing 420 by protruding therefrom to the outside.

The lid casing 420 may include: an outer wall 422 configured to have the shape of a circular ring and to constitute the appearance thereof; an inner wall 424 configured to have a diameter smaller than the diameter of the outer wall 422 and to have the lid hole 401 formed therein; and an upper surface 426 connecting the upper ends of the outer wall 422 and the inner wall 424 to each other.

Particularly, the lid casing 420 may, as a whole, have the shape of a circular ring being hollow thereinside and having a predetermined width. That is, the lid casing 420 may have the lid hole 401 vertically formed through the center of the inside thereof, and may have the structure of a circular ring having a U-shaped section.

The container lid 400 is intended to cover the upper surface of the container body 100, and the lid hole 401 may be formed in the center of the container lid 400 by being vertically formed therethrough, and the cap 450 may be removably mounted to the lid hole 401. That is, as illustrated in the drawing, a hole may be formed in the center of the container lid 400 by being vertically formed therethrough and may constitute the lid hole 401, and the cap 450 may cover such a lid hole 401.

The gasket 402 blocking the gap between the container lid 400 and the container body 100 and a support ring 412 fixing and supporting the gasket 402 may be provided on a side of the lid body 410.

Accordingly, the support ring 412 and the gasket 402 having circular ring shapes may be provided on the lower side of the lid body 410. The support ring 412 may be fixed to the lower end of the lid body 410 by adhesive, and the gasket 402 may be in close contact with and coupled to the outer surface of the support ring 412.

More particularly, the support ring 412 may be coupled to the lower side of the outer wall 422, and the gasket 402 may be in close contact with and coupled to the outer surface of the support ring 412.

A support groove 412a may be formed in the outer surface of the support ring 412 by being recessed inward therefrom, and the gasket 402 may be received in and coupled to such a support groove 412a.

The gasket 402 may function to block the gap between the container lid 400 and the container body 100, and to prevent the container lid 400 mounted to the container body 100 from being unintentionally removed from the container body 100.

Accordingly, the gasket 402 may be made of an elastic material, and as illustrated in the drawing, multiple corrugations may be formed in the outer circumferential surface of the gasket 402.

Accordingly, the gasket 402 may be coupled to the outer surface of the lid casing 420. That is, the support groove 412a may be formed in the outer surface of the lid casing 420 by being recessed inward therefrom, and the gasket 402 may be configured to be coupled to the support groove 412a.

Without a separate support ring 412 being formed, the support groove 412a may be formed on the outer surface of the lid casing 420, or the support ring 412 may be formed integrally with the lower end of the lid casing 420. That is, the support ring 412 fixing and supporting the gasket 402 may be provided at a side (a lower side) of the lid casing 420, and such a support ring 412 may be formed integrally with the lid casing 420 or may be formed as a separate structure and be coupled to the lower end of the lid casing 420.

The cap 450 may be composed of an upper plate 452 exposed from the upper side of the lid body 410, and a cap body 454, at least a portion of which is received in the lid hole 401.

As illustrated in the drawings, the cap body 454 may be configured to have the shape of a truncated cone or a cylinder having a hollow inner portion as a whole. That is, the cap body 454 may be configured to have the shape of a truncated cone gradually decreasing in diameter upward or the shape of a cylinder having the same top and bottom diameters.

The upper plate 452 may cover the upper surface of the cap body 454 having a predetermined height, and as illustrated in the drawings, may be configured to have a diameter larger than the diameter of the upper end of the cap body 454.

A middle ring 456 may be formed on the cap body 454 by protruding therefrom to the outside, and may be in contact with the inner surface of the upper end of the lid hole 401.

Particularly, the middle ring 456 may be formed by protruding from the middle or upper end of the cap body 454 to the outside, and when the cap 450 is mounted to the lid body 410, the middle ring 456 may constitute the same plane as the upper surface 426 of the lid body 410. Accordingly, the upper surface of the middle ring 456 may be exposed from the upper side of the lid body 410.

A ventilation groove 456a may be formed in the outer circumferential surface of the middle ring 456 by being recessed inward therefrom such that air flows to the upper and lower sides of the middle ring 456 through the ventilation groove. That is, the ventilation groove 456a may function to allow air to flow to the upper and lower sides of the middle ring 456 of the cap 450 through the ventilation groove. As illustrated in FIG. 10, the ventilation groove 456a may be formed by being recessed inward from the outer circumferential surface the middle ring 456.

A seating groove 424a may be formed in the upper end of the inner wall 424 such that the edge of the middle ring 456 sits therein. That is, as illustrated in FIG. 12, the seating groove 424a may be formed in the upper end of the inner surface of the inner wall 424 by being recessed outward therefrom to be stepped.

The inner circumferential surface of the seating groove 424a may be configured to have size corresponding to or larger than the size of the outer circumferential surface of the middle ring 456, and the inner diameter of the upper end of the inner wall 424 may have size smaller than the size of the outer diameter of the middle ring 456. Accordingly, the middle ring 456 may sit in the seating groove 424a, and may be supported thereby such that the middle ring 456 does not move downward towards the lower side of the inner wall 424.

As illustrated in FIG. 12, the outer wall 422 may be configured to have a vertical size corresponding to the vertical size of the inner wall 424, or have a vertical size larger or smaller than the vertical size of the inner wall 424.

The locking means 440 may include a locking protrusion 442 formed by protruding from the lid body 410 from a side thereof, and a locking passage 444 formed in the cap 450 and receiving the locking protrusion 442. That is, the locking means 440 may include the locking protrusion 442 protruding inward from the inner circumferential surface of the lid body 410, and the locking passage 444 formed by being recessed inward from the outer circumferential surface of the cap 450 such that the locking protrusion 442 moves or is received therein.

Hereinafter, the structures and positions of the locking protrusion 442 and the locking passage 444 will be described further in detail.

The locking protrusion 442 may be formed by protruding inward from the inner surface of the inner wall 424. That is, the locking protrusion 442 may be formed at a position spaced apart by a predetermined distance upward from the lower end of the inner wall 424.

More particularly, a contact surface 424b may be formed on the inner surface of the inner wall 424 by protruding inward therefrom, the contact surface being in close contact with the outer surface of the cap body 454. That is, a portion of the lower half part of the inner wall 424 may be configured by protruding inward, and constitute the contact surface 424b. Such a contact surface 424b may be configured to have multiple contact surfaces on the inner wall 424. However, in the embodiment of the present disclosure, two contact surfaces are illustrated to be formed symmetrically to each other on the front and rear or the left and right of the inner wall 424.

The locking protrusion 442 may be formed by protruding inward from the contact surface 424b. That is, as illustrated in FIG. 12, the locking protrusion 442 may be formed by protruding inward (towards the center of the container lid) from the contact surface 424b, and may be formed at the position spaced apart by the predetermined distance upward from the lower end of the contact surface 424b.

A distance by which the locking protrusion 442 is spaced apart upward from the lower end of the cap body 454 or the contact surface 424b may correspond to the vertical length of an entrance groove 444a of the cap 450 to be described below.

Of course, the locking protrusion 442 may be formed on other portions except for the contact surface 424b. The contact surface 424b may protrude inward from the inner wall 424, so in the case in which the locking protrusion 442 is formed on the inner surface of the inner wall 424 instead of the contact surface 424b, the protruding size of the locking protrusion 442 may be larger than in the case in which the locking protrusion 442 is formed on the contact surface 424b.

The locking protrusion 442 described above may formed to correspond to the locking passage 444 in number and position. Accordingly, the locking protrusion 442 may be formed to have at least one locking protrusion on the inner wall 424 or the contact surface 424b. However, in the embodiment of the present disclosure, two locking protrusions 442 are illustrated to be formed on the inner wall 424 or the contact surface 424b to face each other at positions thereof symmetrical to each other.

A return groove 424c may be formed at a side of the contact surface 424b by being recessed therefrom to the outside more than the contact surface 424b, the return groove being a path allowing food located on the upper side of the contact surface 424b to fall downward. That is, the contact surfaces 424b may be configured to have two contact surfaces 424b formed by being divided at positions symmetrical to each other on the lower half part of the inner wall 424, and the return groove 424c may be formed between such two contact surfaces 424b.

The return groove 424c may have a shape recessed towards the outside more than the contact surface 424b, and the upper and lower parts thereof may be open. Accordingly, when food in the container body 100 splatters onto the contact surface 424b with the cap 450 mounted to the lid body 410, the food may fall downward through the return groove 424c and be introduced into the container body 100.

A return guide 424d may be formed on an end of the contact surface 424b such that the height of the upper end of the return guide gradually decreases towards a side thereof, the return guide guiding the movement of the food located on the upper side of the contact surface 424b towards the return groove 424c.

Particularly, the return guide 424d may be slantingly formed at the opposite ends of the contact surface 424b, or at a left or right end thereof to have the height of the upper end thereof gradually decreasing towards the left or right. Accordingly, food positioned on the upper side of the contact surface 424b may slide down along the return guide 424d towards the return groove 424c, and finally fall down into the container body 100 located under the return groove 424c therethrough.

The locking passage 444 may be formed in the outer circumferential surface of the cap 450; provide the moving path of the locking protrusion 442; and maintain the received state of the locking protrusion 442 therein, so that the cap 450 may be coupled to the lid body 410.

The locking passage 444 may be formed by being recessed inward from the outer circumferential surface of the cap 450, and may include the entrance groove 444a guiding the vertical movement of the locking protrusion 442, and a locking groove 444b formed by extending horizontally from the end of the entrance groove 444a and supplying space to receive the locking protrusion 442.

Particularly, a pair of locking passages 444 may be formed in the outer circumferential surface of the lower end portion of the cap body 454. The number of such a locking passage 444 may be the same as the number of the locking protrusion 442.

As illustrated in FIG. 11, the entrance groove 444a may be formed by extending upward from the lower end of the cap body 454. Such an entrance groove 444a may be formed to have a predetermined length upward from the inner surface of the lower end of the cap body 454. That is, the vertical length of the entrance groove 444a may correspond to a distance ranging from the lower end of the inner wall 424 to the locking protrusion 442.

The locking groove 444b may be formed by extending from the upper end of the entrance groove 444a to the left or right perpendicular thereto. That is, the entrance groove 444a may be formed vertically, but the locking groove 444b may be formed horizontally. Accordingly, the upper end of the entrance groove 444a may be connected to the left or right end of the locking groove 444b. Accordingly, the locking protrusion 442 may move while being received in the entrance groove 444a and the locking groove 444b.

A removal prevention protrusion 446 may be formed in the locking groove 444b by protruding therefrom to the outside, the removal prevention protrusion preventing the removal of the locking protrusion 442 received in the locking groove 444b. That is, as illustrated in FIG. 11, the removal prevention protrusion 446 having a predetermined size may be formed in the horizontally formed locking groove 444b by protruding therefrom to the outside.

The removal prevention protrusion 446 may be formed to vertically cross the locking groove 444b. The protruding size of such a removal prevention protrusion 446 may be formed to have size smaller than the depth of the locking groove 444b.

The removal prevention protrusion 446 may be formed at a position adjacent to the end of the locking groove 444b. FIG. 11 illustrates the removal prevention protrusion 446 formed at position adjacent to the right end of the locking groove 444b.

Furthermore, a reinforcement part 454a may be formed on the inner circumferential surface of the cap body 454 by protruding inward therefrom. That is, a side (the inner surface of the cap body 454) opposite to the position of the cap body 454 in which the locking passage 444 is formed may protrude inward. Accordingly, even when the locking passage 444 is formed in the outer circumferential surface of the cap body 454 located at a position at which the inner surface protruding inward is located, the cap body 454 may maintain a predetermined thickness.

FIGS. 14 to 17 illustrate a configuration of the container lid 400 according to a second embodiment of the present disclosure. That is, in the above, the container lid provided in the blender which is used generally is described as an example. Hereinafter, referring to FIGS. 14 to 17, an example of the container lid applied to the blender used by making the inside of the container body 100 in a vacuum state will be described.

FIGS. 14 and 15 are a perspective view and a cutaway perspective view of the container lid, respectively, according to the second embodiment of the present disclosure, and FIGS. 16 and 17 are an exploded perspective view and a cutaway exploded perspective view of the container lid, respectively, according to the second embodiment of the present disclosure.

Hereinafter, in the configuration of the container lid 400 described above, the parts having the same or similar function use the same reference numerals, and duplicate descriptions thereof are omitted.

As illustrated in these drawings, the second embodiment is the same as the first embodiment in that the container lid 400 may include the lid body 410 having the lid hole 401 vertically formed therethrough; the cap 450 covering the lid hole 401; and the locking means 440 allowing the cap 450 to be removably mounted to the lid body 410.

In addition, the locking means 440 may include the locking protrusion 442 formed by protruding from the lid body 410 to a side thereof, and the locking passage 444 formed in the cap 450 and receiving the locking protrusion 442.

However, hereinafter, the configuration of the cap 450 is slightly different for forming a vacuum state inside the container body 100. Accordingly, the different configuration of such a cap 450 will be described below.

As described above, even in this embodiment, the cap 450 may be composed of the upper plate 452 exposed to the upper side of the lid body 410, and the cap body 454 received in the lid hole 401.

However, unlike the first embodiment, in the second embodiment, the entirety of the cap body 454 having the shape of a cylinder or a truncated cone may be configured to be received in the lid hole 401, and the upper plate 452 may be formed to have a predetermined thickness.

In addition, as illustrated in FIG. 17, a cap groove 460 may be formed in the upper plate 452 of the cap 450 by being depressed. The cap groove 460 may be formed at the center of the upper plate 452 by being depressed from the upper surface of the upper plate 452 to have a predetermined depth.

A cap hole 462 may be formed in the bottom surface of the cap groove 460 by being vertically formed therethrough. That is, as illustrated in FIG. 17, the cap hole 462 may be formed at the center portion of the bottom surface of the cap groove 460 by being vertically formed therethrough, and the diameter of such a cap hole 462 may be smaller than the inner diameter of the cap groove 460.

At least one air hole 464 may be formed at one side of the cap hole 462 by being vertically formed through the bottom surface of the cap groove 460. That is, as illustrated in FIG. 17, the multiple air holes 464 may be formed at an outer side of the cap hole 462 by being vertically formed therethrough.

Each of the air holes 464 may guide air inside the container body 100 to be discharged upward, or may guide air from the upper side to flow into the container body 100.

As illustrated in FIG. 17, the air hole 464 may have a size smaller than the size of the cap hole 462. In the embodiment of the present disclosure, a total of four air holes 464 are formed to be in the front, rear, left, and right of the cap hole 462.

A cap inner wall 466 having a cylindrical shape may be formed on the lower end surface of the cap groove 460 by extending downward therefrom. That is, the cap inner wall 466 having a shape corresponding to the shape of the cap body 454 may be formed inside the cap body 454 to vertically have a predetermined length.

The cap inner wall 466 may be configured to have a cylindrical shape, and have a diameter smaller than the diameter of the cap body 454. The lower end of the cap inner wall 466 may be configured by protruding more downward than the lower end of the cap body 454.

An upper end edge 452a may be formed on the edge of the upper plate 452 of the cap 450 by protruding upward therefrom.

The upper end edge 452a may function to guide the coupling of a vacuum suction device (not shown) to the upper surface of the upper plate 452 such that the vacuum suction device is in close contact with the upper surface of the upper plate 452.

A covering member 470 which has elasticity and is changeable in shape may be provided in the cap hole 462 so as to cover the cap hole 462. That is, as illustrated in FIG. 17, the covering member 470 depressed at the center thereof may be mounted to the cap hole 462, and the upper surface of such a covering member 470 may cover the multiple air holes 464.

The entirety of the covering member 470 may be made of an elastic material, but at least the edge of the upper surface of the covering member 470 may be made of an elastic material such as rubber. While the covering member 470 is mounted to the cap hole 462, the covering member 470 may be installed to cover the upper side of the air holes 464 formed in the bottom surface of the cap groove 460.

Accordingly, when the covering member 470 is installed to selectively cover the air holes 464, the covering member 470 allows the air holes 464 to be open only when air inside the container body 100 is intended to be discharged to the outside.

A press member 472 pressing the covering member 470 may be received in the cap groove 460.

As illustrated in FIG. 17, the press member 472 may have a T-shaped section, and the upper surface thereof may be configured to have the shape of a circular plate. Furthermore, the center portion of the press member 472 may protrude downward, and a portion of the protruding part may be inserted to and mounted to the covering member 470.

The press member 472 may be installed to vertically move inside the cap groove 460. Accordingly, with the press member 472 received in the cap groove 460, the press member 472 may be moved upward or downward by the vacuum suction device (not shown) of the outside. In this case, the press member 472 may press the center of the covering member 470 by moving upward or downward.

The lower end of the press member 472 may be coupled to the covering member 470, and the press member 472 may be made of an elastic material. Accordingly, when the press member 472 is moved upward by the vacuum suction device (not shown), the upper surface of the covering member 470 may be spaced apart from the bottom surface of the cap groove 460.

Contrarily, when the press member 472 presses the center of the covering member 470 by the vacuum suction device (not shown) with the covering member 470 mounted to the cap hole 462, the edge of the upper surface of the covering member 470 may be moved upward since the covering member 470 is made of an elastic material.

Accordingly, when the upper surface of the covering member 470 is moved upward or the edge of the upper surface thereof is moved upward, the air holes 464 covered by the upper surface of the covering member 470 may be open.

Accordingly, the press member 472 moved by the vacuum suction device (not shown) of the outside may function to move the upper surface of the covering member 470 upward or to open the air holes 464 covered by the covering member 470 by pressing the center of the covering member 470.

Accordingly, as described above, except for the case in which the vacuum suction device (not shown) of the outside coupled to the upper plate 452 of the cap 450 may press down the press member 472, the vacuum suction device may be configured to raise the press member 472 and open the air holes 464 or the cap hole 462 such that the inside of the container body 100 becomes vacuum.

A sealing member 474 may be provided at a side of the cap 450, the sealing member covering a gap between the cap 450 and the lid body 410. That is, the sealing member 474 may be provided at the outer side of the cap 450 and cover the gap between the cap 450 and the lid body 410.

More particularly, when the cap 450 is mounted to the lid hole 401 of the lid body 410, the gap may be defined between the edge of the cap 450 and the inner surface of the lid hole 401 and thus air may flow therethrough. Accordingly, the sealing member 474 may cover the gap between the lid hole 401 of such a lid body 410 and the cap 450, and block the flow of air.

A mounting groove 452b may be formed in the outer surface of the upper plate 452 of the cap 450 by being recessed inward therefrom, and the inner circumferential surface of the sealing member 474 may be received in such a mounting groove 452b.

Particularly, the mounting groove 452b having a predetermined size may be formed in the outer circumferential surface of the upper plate 452 of the cap 450 by being recessed inward therefrom.

In addition, the sealing member 474 may be made of an elastic material such as rubber, and may include a contact part 474a received in the mounting groove 452b, and a covering part 474b formed by extending from the lower end of the contact part 474a to the outside.

The sealing member 474 may be elastic, so when the contact part 474a is mounted to the mounting groove 452b by elasticity, the covering part 474b may be in close contact with the upper surface 426 of the lid body 410.

Accordingly, when the cap 450 is mounted to the lid hole 401 of the lid body 410, the gap between the lid body 410 and the cap 450 may be covered by the sealing member 474.

Furthermore, FIG. 18 is a front cross-sectional view illustrating a state in which the lid exterior material 430 is removed from the container lid according to the second embodiment of the present disclosure, and FIG. 19 is a bottom exploded perspective view illustrating a configuration of the lid body 410 of the container lid according to the second embodiment of the present disclosure.

As illustrated in these drawings, the lid exterior material 430 may be provided in the container lid 400, the lid exterior material covering the side surface of the container lid. Furthermore, in the present disclosure, the lid exterior material 430 is illustrated to cover the side surface of the container lid 400, but the lid exterior material 430 may be configured to cover the upper surface of the container lid 400 or to simultaneously cover the upper surface and the side surface of the container lid 400.

Accordingly, when the lid exterior material 430 made of stainless steel covers the side surface or the upper surface of the container lid 400, the lid exterior material 430 may have a smooth surface and a high-quality image.

In addition, as described above, the container lid 400 may include the lid body 410 having the lid hole 401 vertically formed therethrough, and the cap 450 removably mounted to the lid body 410 and covering the lid hole 401. Accordingly, the lid exterior material 430 may cover the side surface of the lid body 410.

More particularly, the lid exterior material 430 may be mounted to cover the side surface of the lid casing 420 constituting the lid body 410.

The gasket 402 blocking the gap between the container lid 400 and the container body 100, and the support ring 412 fixing and supporting the gasket 402 may be provided at the lower side of the lid casing 420.

Particularly, the support ring 412 may be coupled to the lower side of the outer wall 422 of the lid casing 420, and the gasket 402 may be mounted to the outer surface of the support ring 412 to be in close contact therewith. That is, the support groove 412a may be formed in the outer surface of the support ring 412 by being recessed inward therefrom, and the gasket 402 may be received and mounted in the support groove 412a.

The support ring 412 may be coupled to the lid casing 420 by heat fusion. That is, the upper end of the support ring 412 may be fixed to the lower end of the outer wall 422 by the heat fusion.

The lid exterior material 430 may include a side surface part 432 covering the side surface of the lid casing 420, and a bent part 434 extending by being bent inward perpendicularly to the lower end of the side surface part 432. That is, a predetermined portion of the lower end of the lid exterior material 430 may be configured to be bent inward.

Accordingly, as illustrated in the drawings, when the lid exterior material 430 is mounted to the lid casing 420, the side surface part 432 may cover the side surface of the lid casing 420, and the bent part 434 may be inserted to a position between the lid casing 420 and the support ring 412.

Accordingly, when the lower end of the lid exterior material 430 made of stainless steel is configured to be bent inward, the lower end of the lid exterior material 430 may not be exposed to the outside, so a user may be prevented from being injured by the sharp lower end of the lid exterior material 430. The bent part 434 may cover the lower ends of the slit ribs 420a, so external foreign matter may be prevented from being introduced through gaps between the multiple slit ribs 420a.

Meanwhile, as described above, at least one slit rib 420a may be formed on the side surface of the lid casing 420 by protruding therefrom to the outside. In addition, such a slit rib 420a may be configured as a pair of slit ribs. That is, the slit rib 420a may be configured to have the shape of a rib having a length corresponding to the vertical height of the outer wall 422 of the lid casing 420, and such a slit rib 420a may be configured to have pairs of two slit ribs to be spaced apart by a predetermined distance from each other.

Accordingly, a rib gap 420b having a predetermined size may be defined between the pair of slit ribs 420a, and the adhesive may be applied to or filled in such a rib gap 420b. The adhesive provided in the rib gap 420b may include silicon, but various types of adhesive or elastic bodies having the function of attaching the lid exterior material 430 to the lid casing 420 may be used.

Accordingly, when the adhesive is applied to or filled in the rib gap 420b of the pair of slit ribs 420a, the lid exterior material 430 may be coupled to the lid casing 420 by the adhesive force of the adhesive.

Of course, as described above, a diameter between the ends of the slit ribs 420a formed at sides opposite to each other on the lid casing 420 may be configured to be larger than the inner diameter of the lid exterior material 430 such that the lid exterior material 430 is coupled to the lid casing 420 by forcible fitting, or the forcible fitting and the application of the adhesive may be used together such that the lid exterior material 430 is coupled to the lid casing 420.

In addition, the lower end of the outer wall 422 of the lid casing 420 may be configured to be located at a position lower than the lower end of each of the slit ribs 420a. That is, when the support ring 412 is coupled to the lower end of the outer wall 422 of the lid casing 420 by fusion, and the lid exterior material 430 is mounted to cover the outer surface of the lid casing 420, the bent part 434 of the lid exterior material 430 may be located on the lower side of the lower ends of the slit ribs 420a.

Accordingly, the lower end of the outer wall 422 of the lid casing 420 may be configured to be located at a position lower by the thickness of the bent part 434 than the lower end of each of the slit ribs 420a.

Hereinafter, an operation of the blender of the present disclosure having the above-described configuration will be described with reference to the accompanying drawings.

When the container body 100 sits on the blender body 500, the state of FIG. 1 may be realized, and in this state, the operation of the blender of the present disclosure may start.

First, power supply from the outside is required for a user to operate the blender, and a wireless power supply device having the wireless power module 520 may be used for such power supply. That is, the power supply from the outside may be performed by the induced electromotive force. Of course, the power supply may be performed by wire.

The power of the wireless power module 520 may be supplied to the blender parts, in which power is required, such as the motor assembly 600, the manipulation part 504, and the power transmission means 700, and a user may start or stop the operation of the blender by manipulating the manipulation part 504 or the knob 502.

For example, when a user starts crushing food by manipulating the manipulation part 504 or the knob 502, the motor assembly 600 is required to be operated to rotate the blades of the blade assembly 200.

However, in this case, the detection system may determine whether the container lid 400 is closed on the container body 100, and when the container body 100 is open, the operation of the motor assembly 600 and the blade assembly 200 may be prevented.

Particularly, since the reed switch 234 may be normally open (off), the power reception means 220, the reed switch 234, and the light transmission module 810 may not form a closed circuit in the container body 100, so that the light reception module 820 may not receive light.

Accordingly, when the light reception module 820 does not receive light, the power supply to the motor assembly 600 may be cut off by such a signal.

In this state, when the container lid 400 is closed, the permanent magnet 232 of the container lid 400 may be located to be adjacent to the reed switch 234, and the reed switch 234 may be turned on, whereby the power reception means 220, the reed switch 234, and the light transmission module 810 may form a closed circuit, so the light reception module 820 may receive light transmitted by the light transmission module 810.

In this case, due to the detection of the closing of the container lid 400, the motor assembly 600 may start operating by the manipulation of a user, and food inside the container body 100 may be crushed. Of course, in this case, whether the container body 100 is mounted to the blender body 500 may be detected by the container body detection switch 960 prior to the starting of the operation of the motor assembly 600.

In addition, in this case, the operation state of the blender of the present disclosure may be displayed to the outside by the display part 506, so a user may visually recognize the operation state or time of the blender.

Meanwhile, when the container lid 400 is mounted to or removed from the container body 100, a user may open or close the container lid 400 by grasping the upper half part of the cap 450. The container lid 400 may be in close contact with and mounted to the upper surface of the container body 100 by a force of pushing the container lid 400 downward by a user. In this case, the gap between the container lid 400 and the container body 100 may be covered by the gasket 402 provided on the outer surface of the container lid 400.

When food inside the container body 100 is crushed or mixed by the operation of the motor assembly 600 and the blade assembly 200 and work according to the intention of a user is completed, the user may raise and remove the container body 100 upward from the blender body 500, open the container lid 400, and take out the food contained inside the container body 100.

In addition, the user may remove the cap 450 mounted to the center of the container lid 400 therefrom, and this removal of the cap may be performed by movement in which a user rotates and moves upward the upper end portion of the cap 450 by grasping the upper end portion thereof.

More particularly, when the cap 450 is mounted to the lid body 410 of the container lid 400, the locking protrusion 442 may be located at the right end of the locking groove 444b (see FIGS. 11 and 16). That is, the locking protrusion 442 may be located at the right of the removal prevention protrusion 446.

In this state, when a user grasps and turns counterclockwise (when viewed from above) the upper end portion of the cap 450 with their hand, the cap 450 may be rotated counterclockwise. Accordingly, the locking protrusion 442 located at the right end of the locking groove 444b may move beyond the removal prevention protrusion 446 to the left thereof.

Continuously, the locking protrusion 442 may move to the left of the locking groove 444b and reach the left end thereof, and next, the cap 450 may be raised by the user. In this case, the locking protrusion 442 reaching the left end of the locking groove 444b may move from the upper end of the entrance groove 444a to the lower side thereof, and be removed from the locking passage 444.

In this case, the cap 450 may be completely removed upward from the lid body 410 and the removal of the cap 450 may be completed.

The process of the mounting of the cap 450 to the lid body 410 may be performed in the reverse order of the removal of the cap.

First, when the entrance groove 444a of the cap 450 is located at the upper side of the locking protrusion 442 of the lid body 410, and the cap 450 is lowered downward, and the locking protrusion 442 may be located at the upper end portion of the entrance groove 444a. In this state, when the cap 450 is turned clockwise (when viewed from above), the locking protrusion 442 may move to the right of the locking groove 444b, move beyond the removal prevention protrusion 446, and be located at the right of the removal prevention protrusion 446.

Due to such a process, the cap 450 may be stably mounted to the lid body 410, and a user may recognize the complete mounting of the cap 450 to the lid body 410 by hearing a click sound or feeling an impact applied to their hand which occurs when the locking protrusion 442 passes through the removal prevention protrusion 446.

When the cap 450 is removed from the lid body 410, a user may insert food into the container body 100 through the lid hole 401, and may control the food contained inside the container body 100 by using a rod.

In addition, according to the second embodiment of the container lid 400, when the cap 450 is completely mounted to the lid body 410, a user may discharge air inside the container body 100 to the outside by using the vacuum suction device (not shown) and may vacuumize the inside of the container body.

Meanwhile, the lid exterior material 430 may be mounted to cover the side surface of the lid casing 420 constituting the lid body 410. That is, the support ring 412 may be fixed to the lower side of the lid casing 420 by fusion, and the gasket 402 may be mounted to such a support ring 412.

Next, the lid exterior material 430 may be mounted to the outer wall 422 of the lid casing 420.

In this case, as illustrated in the drawings, the lid exterior material 430 made of stainless steel may cover the side surface of the lid casing 420, and the bent part 434 of the lower end of the lid exterior material 430 may be inserted into and mounted to the position between the lid casing 420 and the support ring 412.

The scope of the present disclosure is not limited to the embodiments illustrated above, and within the technical scope as described above, many other modifications based on the present disclosure will be possible for those skilled in the art and are intended to be within the scope of the claims.

What is claimed is:

1. A blender comprising:
    a container body to receive food;
    a blender body to support the container body; and
    a container lid removably mountable to an upper surface of the container body to open and close the upper surface of the container body,
    wherein the container lid comprises:
    a lid casing having a gasket provided at a lower portion thereof;
    a lid exterior material covering at least one surface of the lid casing, a lower part of the lid exterior material extending up to an upper part of gasket; and
    a support ring provided at a lower side of the lid casing to fix and support the gasket,
    wherein the lid exterior material comprises:
    a side surface part covering a side surface of the lid casing; and
    a bent part extending by being bent inward perpendicularly to a lower end of the side surface part,
    wherein the bent part is inserted to a position between the lid casing and the support ring,
    wherein the lower end of the lid exterior material being bent inward therefrom forms the bent part, and is in contact with an upper end of the support ring.

2. The blender of claim 1, wherein a support groove is formed in an outer surface of the lid casing by being recessed inward therefrom, and the gasket is mounted to the support groove.

3. The blender of claim 1, wherein the support ring is formed integrally with the lid casing, or is formed as a structure separate therefrom and is coupled to a lower end of the lid casing.

4. The blender of claim 3, further comprising a support groove formed at an outer surface of the support ring by being recessed inward therefrom, and the gasket is received in the support groove.

5. The blender of claim 1, wherein an upper end of the support ring is coupled to a lower end of the lid casing by fusion.

6. The blender of claim 1, further comprising a support groove formed at an outer surface of support ring by being recessed inward therefrom, and the gasket is received and mounted to the support groove.

7. The blender of claim 1, wherein the lid exterior material is made of stainless steel.

8. The blender of claim 1, further comprising at least one slit rib formed at a side surface of the lid casing and protruding therefrom to an outside.

9. The blender of claim 8, wherein the at least one slit rib comprises a pair of slit ribs, and a gap having a predetermined size is defined between the pair of slit ribs.

10. The blender of claim 9, further comprising an adhesive provided in the gap defined between the pair of slit ribs.

11. The blender of claim 10, wherein the adhesive comprises silicone.

12. The blender of claim 1, wherein the container lid further comprises:
    a lid body having a lid hole vertically formed therethrough; and
    a cap removably mountable to the lid body to cover the lid hole,
    wherein the lid body comprises the lid casing having the lid hole vertically formed through a center thereof, and the lid exterior material covering a side surface of the lid casing.

13. The blender of claim 12, wherein the lid casing comprises:
    an outer wall including a shape of a circular ring and constituting an appearance of the lid casing;
    an inner wall having a diameter smaller than a diameter of the outer wall and having the lid hole formed therein; and
    an upper surface connecting upper ends of the outer wall and the inner wall to each other,
    wherein the gasket and a support ring fixing and supporting the gasket are provided at a side of the lid casing.

14. The blender of claim 13, wherein the support ring is coupled to a lower side of the outer wall, and the gasket is in contact with and mounted to an outer surface of the support ring.

15. The blender of claim 13, further comprising a support groove formed at an outer surface of the support ring by being recessed inward therefrom, and the gasket is received and mounted to the support groove.

\* \* \* \* \*